(12) United States Patent
Tsunoda

(10) Patent No.: US 8,192,894 B2
(45) Date of Patent: Jun. 5, 2012

(54) PLATE-LAMINATING TYPE FUEL CELL

(75) Inventor: Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 11/795,182

(22) PCT Filed: Jan. 13, 2006

(86) PCT No.: PCT/JP2006/300784
§ 371 (c)(1),
(2), (4) Date: Jul. 12, 2007

(87) PCT Pub. No.: WO2006/075792
PCT Pub. Date: Jul. 20, 2006

(65) Prior Publication Data
US 2008/0096088 A1   Apr. 24, 2008

(30) Foreign Application Priority Data

Jan. 14, 2005   (JP) ................................. 2005-007157

(51) Int. Cl.
*H01M 2/00* (2006.01)
*H01M 2/08* (2006.01)
*H01M 2/14* (2006.01)
*H01M 2/18* (2006.01)
*H01M 8/00* (2006.01)
*H01M 8/02* (2006.01)
*H01M 8/04* (2006.01)

(52) U.S. Cl. ......... 429/508; 429/507; 429/513; 429/514

(58) Field of Classification Search ........................ None
See application file for complete search history.

(56) References Cited

U.S. PATENT DOCUMENTS

| | | | | |
|---|---|---|---|---|
| 4,910,100 A * | 3/1990 | Nakanishi et al. | .............. | 429/32 |
| 6,670,068 B1 | 12/2003 | Diez | | |
| 6,777,126 B1 | 8/2004 | Allen | | |

FOREIGN PATENT DOCUMENTS

| | | |
|---|---|---|
| EP | 1 691 435 A1 | 8/2006 |
| JP | 07-201353 | 8/1995 |
| JP | 08-007902 | 1/1996 |
| JP | 2004-127711 | 4/2004 |

(Continued)

OTHER PUBLICATIONS

JP 2004127711 A English Abstract from the PAJ website.*

(Continued)

*Primary Examiner* — Melvin Mayes
*Assistant Examiner* — Colin W Slifka
(74) *Attorney, Agent, or Firm* — Nelson Mullins Riley & Scarborough LLP; Anthony A. Laurentano

(57) ABSTRACT

A fuel cell is formed by stacking an electrolyte electrode assembly and a pair of separators alternately. Each of the separators includes first to third plates. A first cylindrical portion provided at a first small diameter end portion of one separator is inserted into a fuel gas supply passage of the other separator. The first cylindrical portion is subjected to a crimping process such that a joint portion as a predetermined overlapping portion is formed integrally with the one separator and the other separator.

10 Claims, 25 Drawing Sheets

FOREIGN PATENT DOCUMENTS

| | | | |
|---|---|---|---|
| JP | 2004127711 A | * | 4/2004 |
| JP | 2005-268176 | | 9/2005 |
| JP | 2006-173090 | | 6/2006 |
| WO | WO-2005-050766 | | 6/2005 |
| WO | WO-2006-030830 | | 3/2006 |

OTHER PUBLICATIONS

Japanese Office Action for Application No. 2005-007157, dated Jul. 12, 2011.

* cited by examiner

⇨ OXYGEN-CONTAINING GAS
⇨ FUEL GAS
⇨ EXHAUST GAS

---> FUEL GAS
—> OXYGEN-CONTAINING GAS

PLATE-LAMINATING TYPE FUEL CELL

RELATED APPLICATIONS

This application is a 35 U.S.C. 371 national stage filing of International Application No. PCT/JP2006/300784, filed 13 Jan. 2006, which claims priority to Japanese Patent Application No. 2005-007157 filed on 14 Jan. 2005 in Japan. The contents of the aforementioned applications are hereby incorporated by reference.

TECHNICAL FIELD

The present invention relates to a fuel cell formed by stacking an electrolyte electrode assembly and separators alternately. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined numbers of the unit cells and the separators are stacked together to form a fuel cell stack.

In the fuel cell, a gas chiefly containing oxygen or the air (hereinafter also referred to as the "oxygen-containing gas") is supplied to the cathode. The oxygen in the oxygen-containing gas is ionized at the interface between the cathode and the electrolyte, and the oxygen ions ($O^{2-}$) move toward the anode through the electrolyte.

A fuel gas such as a gas chiefly containing hydrogen (hereinafter also referred to as the "hydrogen-containing gas") or CO is supplied to the anode. The oxygen ions react with the hydrogen in the hydrogen-containing gas to produce water or react with CO to produce $CO_2$. Electrons released in the reaction flow through an external circuit to the cathode, creating DC electric energy.

In a fuel cell stack, for example, a fuel gas manifold extending in a direction of stacking the electrolyte electrode assemblies is provided for supplying the fuel gas through the fuel gas manifold to a fuel gas supply passage connected to the anodes of the electrolyte electrode assemblies. Likewise, the oxygen-containing gas is supplied to the cathodes of the electrolyte electrode assemblies through an oxygen-containing gas supply passage. Thus, the fuel gas supply passage and the oxygen-containing gas supply passage need to be sealed hermetically to prevent the mixture, leakage, or the like of the fuel gas and the oxygen-containing gas. Further, desirably, the seal member is an electrically insulating seal member, and thermally stable in the use at high temperature (operating temperature of about 800° C.).

In view of the above, Japanese Laid-Open Patent Publication No. 8-7902 discloses a flat plate type solid oxide fuel cell. Specifically, as shown in FIG. 25, a power generation cell 1 is sandwiched between current collecting plates (or separators) 2a, 2b. The power generation cell 1 includes a positive electrode 4a, a negative electrode 4b, and a ceramic thin membrane 3 interposed between the positive electrode 4a and the negative electrode 4b. Air supply grooves 5a for supplying the air to the positive electrode 4a are formed on the current collecting plate 2a, and fuel gas supply grooves 5b for supplying a fuel gas to the negative electrode 4b are formed on the current collecting plate 2b.

A glassy first seal member 6a is interposed between outer edges of the current collecting plates 2a, 2b. Further, a glassy second seal member 6b is interposed between an outer end of the ceramic thin membrane 3 and the current collecting plate 2b inside the first seal member 6a. The first and second seal members 6a, 6b are melt at high temperature, and a pressure P is applied to the first and second seal members 6a, 6b to form a gas seal.

However, in the above conventional technique, the glassy first and second seal members 6a, 6b are provided at two positions for each of the unit cells. During operation of the fuel cell, the glass component may be shattered or volatilized. As a result, microcracks are generated in the glassy first and second seal members 6a, 6b. Therefore, the first and second seal members 6a, 6b may be degraded undesirably, and the structure is not economical. Further, since space is required for providing the first and second seal members 6a, 6b, the structure is not compact.

DISCLOSURE OF INVENTION

A main object of the present invention is to provide a fuel cell having a simple and compact structure in which it is possible to maintain desired seal performance reliably.

The present invention relates to a fuel cell formed by stacking an electrolyte electrode assembly and a pair of separators alternately in a stacking direction. The electrolyte electrode assembly includes an anode, a cathode, and an electrolyte interposed between the anode and the cathode. Each of the separators includes a first member and a second member which are stacked together. The electrolyte electrode assembly is sandwiched between one separator and the other separator. At least one of the first member of the one separator and the second member of the other separator is plastically deformed to form a joint portion for hermetically sealing a predetermined overlapping portion between the one separator and the other separator.

It is preferable that the first member of the one separator and the second member of the other separator form the joint portion by a crimping process. Further, it is preferable that an insulating member is interposed between the first member of the one separator and the second member of the other separator at the joint portion.

Further, it is preferable that the first and second members selectively form a fuel gas channel for supplying a fuel gas toward the anode and an oxygen-containing gas channel for supplying an oxygen-containing gas toward the cathode.

Further, it is preferable that the first member comprises a single plate, first protrusions forming the fuel gas channel are provided on one surface of the plate, second protrusions forming the oxygen-containing gas channel are provided on the other surface of the plate, and the second member comprises a channel member joined to one surface or the other surface of the plate for forming a fuel gas supply channel connected between a fuel gas supply unit and the fuel gas channel.

Further, it is preferable that the first and second members comprise first and second plates which are stacked together, the fuel gas channel and the oxygen-containing gas channel are formed between the first and second plates, and the fuel gas channel supplies the fuel gas to the anode facing one surface of the separator, and the oxygen-containing gas channel supplies the oxygen-containing gas to the cathode facing the other surface of the separator.

Further, it is preferable that the separator comprises first and second plates which are stacked together, and a third plate interposed between the first and second plates, the first and second members comprises arbitrary two of the first to third plates, and the fuel gas channel is formed between the first plate and the anode, the oxygen-containing gas channel is formed between the second plate and the cathode, and the third plate divides the fuel gas channel and the oxygen-containing gas channel.

BEST MODE FOR CARRYING OUT THE INVENTION

Figure 1:
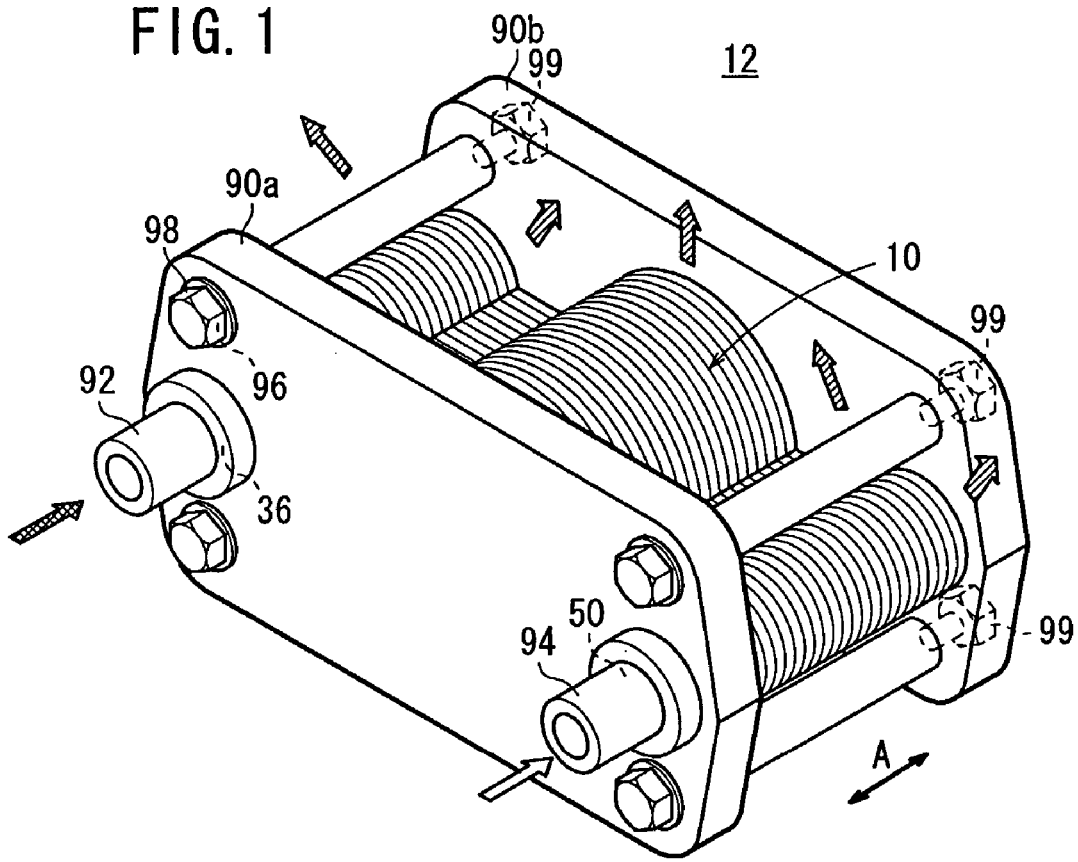
FIG. 1 is a perspective view schematically showing a fuel cell stack formed by stacking a plurality of fuel cells according to a first embodiment of the present invention.

FIG. 1 is a perspective view schematically showing a fuel cell stack 12 formed by stacking a plurality of fuel cells 10 according to a first embodiment of the present invention in a direction indicated by an arrow A.

Figure 2:
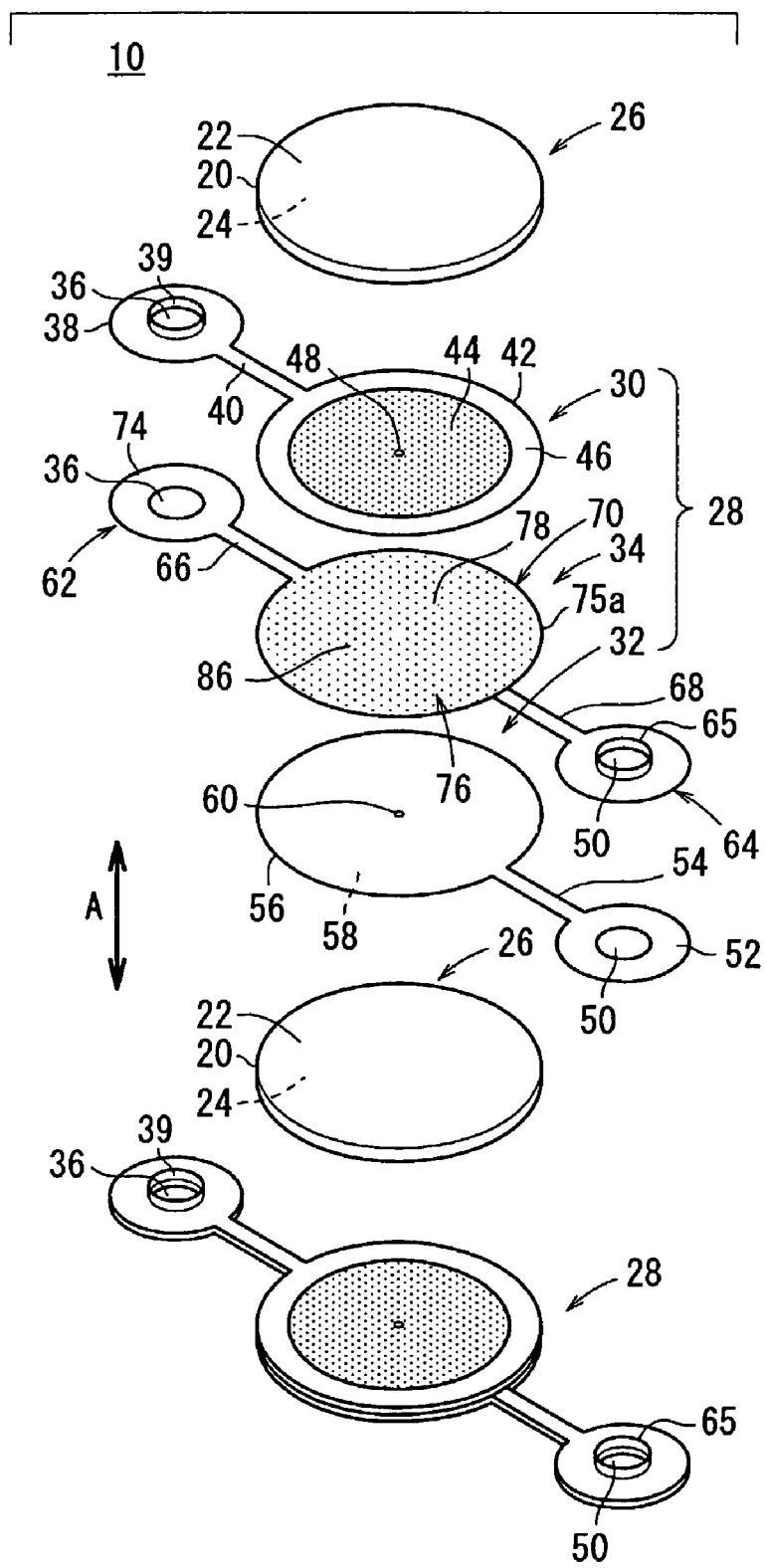
FIG. 2 is an exploded perspective view showing the fuel cell.
Figure 3:
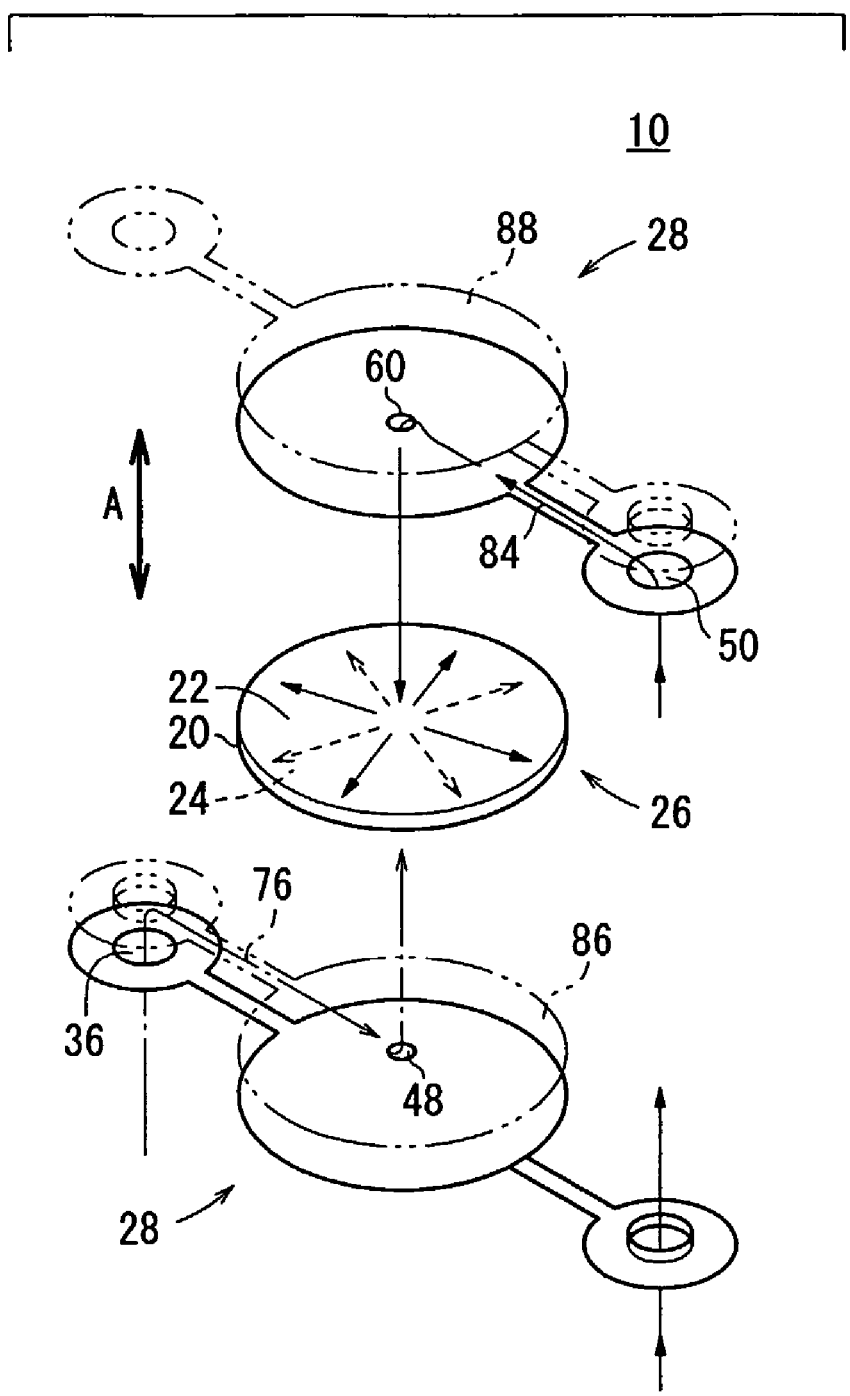
FIG. 3 is a partial exploded perspective view showing gas flows in the fuel cell.

The fuel cell 10 is a solid oxide fuel cell (SOFC) used in various applications, including stationary and mobile applications. For example, the fuel cell 10 is mounted on a vehicle. As shown in FIGS. 2 and 3, the fuel cell 10 includes an electrolyte electrode assembly 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive oxide such as stabilized zirconia. The electrolyte electrode assembly 26 has a circular disk shape.

In the fuel cell 10, the electrolyte electrode assembly 26 is sandwiched between separators 28. Each of the separators 28 includes a first plate 30, a second plate 32, and a third plate 34 interposed between the first and second plates 30, 32. For example, the first to third plates 30, 32, 34 are metal plates of, e.g., stainless alloy. For example, the first plate 30 and the second plate 32 are joined to both surfaces of the third plate 34 by brazing. Arbitrary two of the first to third plates 30, 32, and 34 are first and second members.

As shown in FIG. 2, the first plate 30 has a first small diameter end portion 38 (corresponding to the first member). A fuel gas supply passage 36 for supplying a fuel gas in the stacking direction indicated by the arrow A extends through the first small diameter end portion 38. At the first small diameter end portion 38, a first cylindrical portion 39 for crimping is formed around the fuel gas supply passage 36. The first cylindrical portion 39 protrudes in the direction indicated by the arrow A. The first small diameter end portion 38 is integral with a first circular disk 42 having a relatively large diameter through a narrow bridge 40. The first circular disk 42 and the anode 24 of the electrolyte electrode assembly 26 have substantially the same size.

A large number of first protrusions 44 are formed on a surface of the first circular disk 42 which contacts the anode 24, from a position near the outer circumferential edge to the central position. A substantially ring shaped protrusion 46 is provided on the outer circumferential region of the first circular disk 42. The first protrusions 44 and the substantially ring shaped protrusion 46 jointly function as a current collector.

A fuel gas inlet 48 is provided at the center of the first circular disk 42 for supplying the fuel gas toward substantially the central region of the anode 24. The first protrusions 44 may be formed by a plurality of recesses in a surface which is in the same plane with the surface of the substantially ring shaped protrusion 46.

The second plate 32 has a second small diameter end portion 52 (corresponding to the second member). An oxygen-containing gas supply passage 50 for supplying an oxygen-containing gas in the stacking direction indicated by the arrow A extends through the second small diameter end portion 52. The second small diameter end portion 52 is integral with a second circular disk 56 having a relatively large diameter through a narrow bridge 54.

Figure 4:
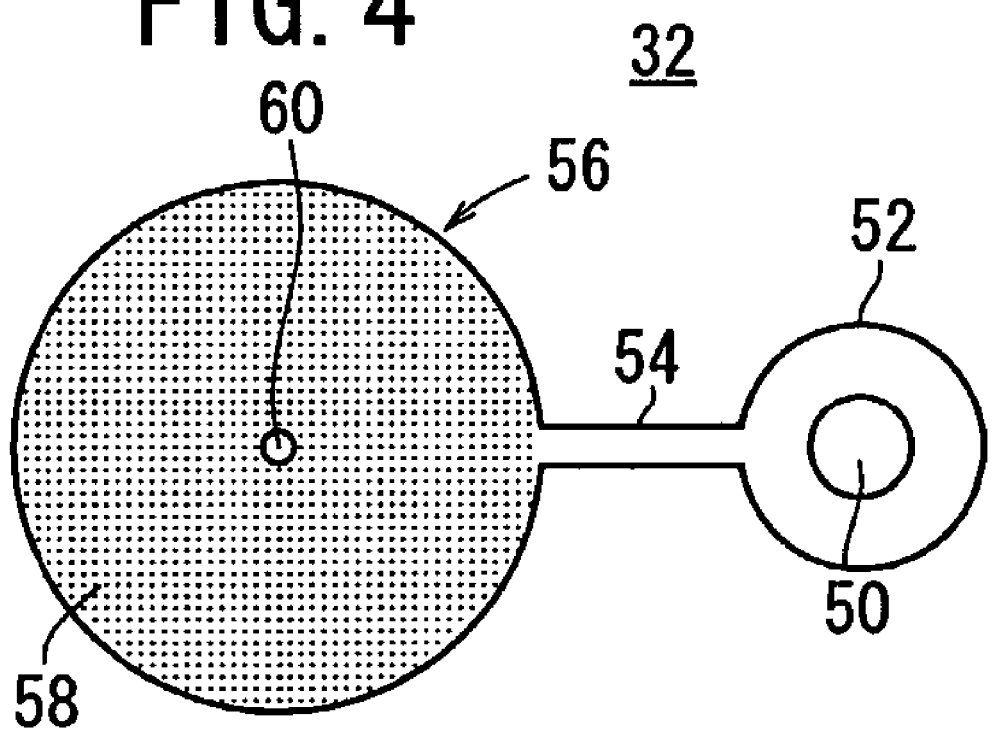
FIG. 4 is a front view showing a second plate of a separator of the fuel cell.

As shown in FIG. 4, a plurality of second protrusions 58 are formed on the entire surface of the second circular disk 56 which contacts the cathode 22 of the electrolyte electrode assembly 26. The second protrusions 58 function as a current collector. An oxygen-containing gas inlet 60 is provided at the center of the second circular disk 56 for supplying the oxygen-containing gas toward substantially the central region of the cathode 22.

As shown in FIG. 2, the third plate 34 includes a third small diameter end portion 62 (corresponding to the second member) and a fourth small diameter end portion 64 (corresponding to the first member). The fuel gas supply passage 36 extends through the third small diameter end portion 62, and the oxygen-containing gas supply passage 50 extends through the fourth small diameter end portion 64. At the fourth small diameter end portion 64, a second cylindrical portion 65 for crimping is formed around the oxygen-containing gas supply passage 50. The second cylindrical portion 65 protrudes in the direction indicated by the arrow A. The third and fourth small diameter end portions 62, 64 are integral with a third circular disk 70 having a relatively large diameter through narrow bridges 66, 68, respectively. The first to third circular disks 42, 56, 70 have the same diameter.

Figure 5:
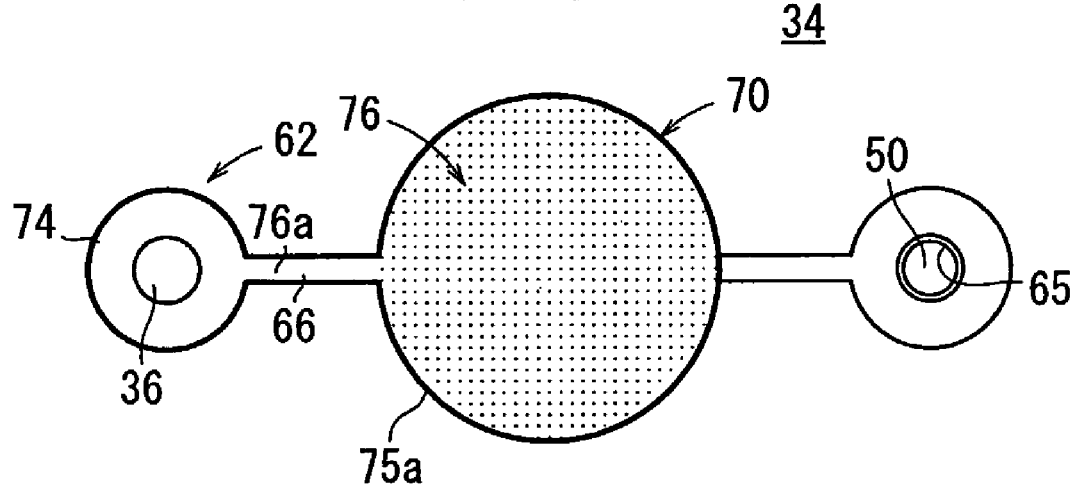
FIG. 5 is a view with partial omission showing one surface of a third plate of the separator.

As shown in FIGS. 2 and 5, the third plate 34 has a recess 74 formed in the third small diameter end portion 62, on a surface facing the first plate 30. The recess 74 is connected to the fuel gas supply passage 36.

Ridges 75a are provided along the outer edges of the third small diameter end portion 62, the bridge 66, and the third circular disk 70 such that a fuel gas channel 76 as described later is formed in the surfaces of the third small diameter end portion 62, the bridge 66, and the third circular disk 70. A plurality of third protrusions 78 are formed in the surface of the third circular disk 70.

Figure 6:
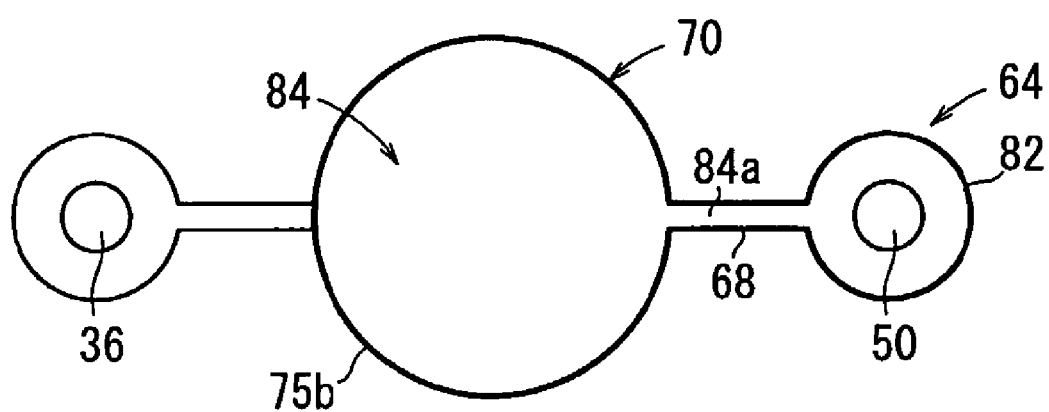
FIG. 6 is a view with partial omission showing the other surface of the third plate.

As shown in FIG. 6, the third plate 34 has a recess 82 formed in the fourth small diameter end portion 64, on a surface which contacts the second plate 32. The recess 82 is connected to the oxygen-containing gas supply passage 50.

Ridges 75b are provided along the outer edges of the fourth small diameter end portion 64, the bridge 68, and the third circular disk 70 such that an oxygen-containing gas channel 84 as described later is formed in the surfaces of the fourth small diameter end portion 64, the bridge 68, and the third circular disk 70.

The first plate 30 is joined to one surface of the third plate 34 by brazing to form the fuel gas channel 76 connected to the fuel gas supply passage 36 between the first and third plates 30, 34. The bridge 40 of the first plate 30 and the bridge 66 of the third plate 34 are joined together to form a fuel gas channel member, and a fuel gas distribution passage 76a as part of the fuel gas channel 76 is formed in the fuel gas channel member (see FIG. 7).

The fuel gas channel 76 forms a fuel gas pressure chamber 86 between the first and third circular disks 42, 70, over the electrode surface of the anode 24. The first circular disk 42 is provided between the fuel gas pressure chamber 86 and the anode 24. That is, when the fuel gas is supplied to the fuel gas pressure chamber 86, the first circular disk 42 tightly contacts the anode 24 under pressure (see FIGS. 7 and 8).

Figure 8:
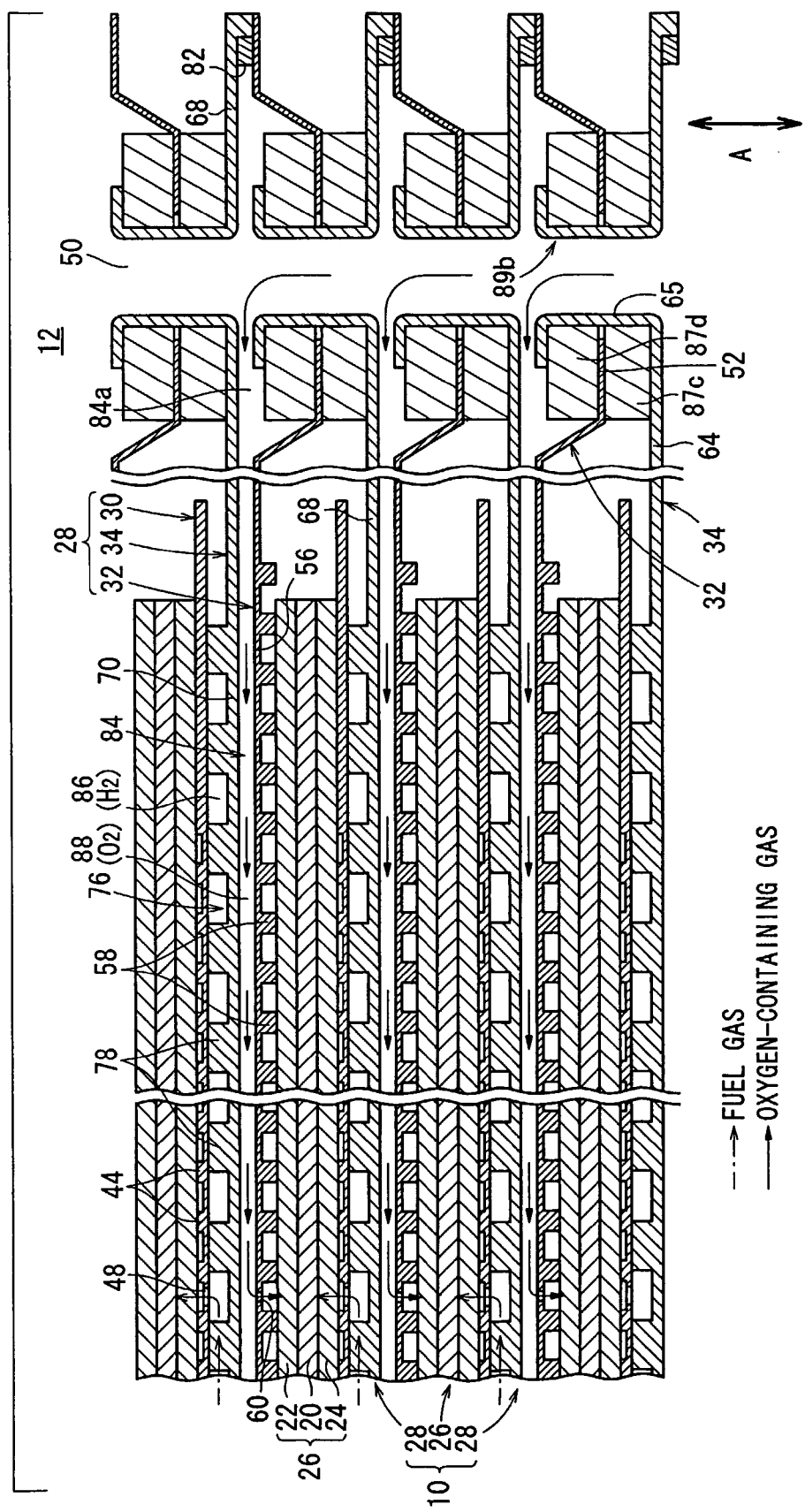
FIG. 8 is an enlarged cross sectional view showing the fuel cell at a position near an oxygen-containing gas supply passage.

The second plate 32 is joined to the third plate 34 by brazing to form an oxygen-containing gas channel 84 connected to the oxygen-containing gas supply passage 50 between the second and third plates 32, 34 (see FIG. 8). The bridge 54 of the second plate 32 and the bridge 68 of the third plate 34 are joined together to form an oxygen-containing gas channel member, and an oxygen-containing gas distribution passage 84a as part of the oxygen-containing gas channel 84 is formed in the oxygen-containing gas channel member.

The oxygen-containing gas channel 84 forms an oxygen-containing gas pressure chamber 88 between the second and third circular disks 56, 70, over the electrode surface of the cathode 22. The second circular disk 56 is provided between the oxygen-containing gas channel 84 and the cathode 22. That is, when the oxygen-containing gas is supplied to the oxygen-containing gas pressure chamber 88, the second circular disk 56 tightly contacts the cathode 22 under pressure (see FIGS. 7 and 8).

Figure 7:
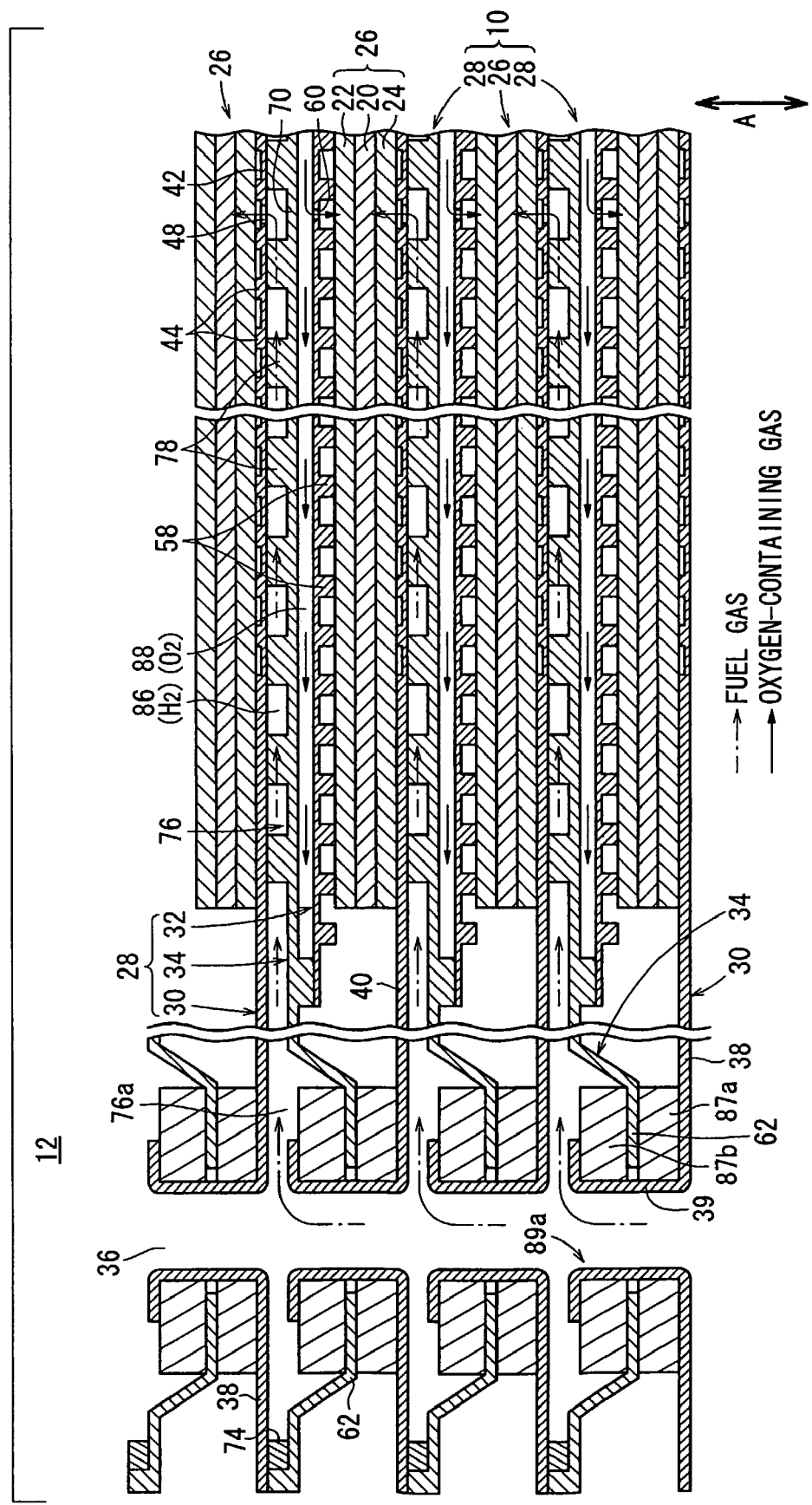
FIG. 7 is an enlarged cross sectional view showing the fuel cell at a position near a fuel gas supply passage.

As shown in FIG. 7, ring shaped insulating members 87a, 87b are provided on both surfaces of the third small diameter end portion 62 around the fuel gas supply passage 36. The insulating member 87a is formed between the first small diameter end portion 38 of the first plate 30 of one separator 28 and the lower surface of the third small diameter end portion 62 of the third plate 34 of the other separator 28. The insulating member 87b is provided on the upper surface of the third small diameter end portion 62. The first cylindrical portion 39 is subjected to a crimping process as described later to form a joint portion 89a. The joint portion 89a hermetically holds the third small diameter end portion 62 such that the insulating members 87a, 87b are interposed between the third small diameter end portion 62 and the joint portion 89a.

As shown in FIG. 8, ring shaped insulating members 87c, 87d are formed on both surfaces of the second small diameter end portion 52 around the oxygen-containing gas supply passage 50. The insulating member 87c is formed between the fourth small diameter end portion 64 of the third plate 34 of one separator 28 and the lower surface of the second small diameter end portion 52 of the second plate 32 of the other separator 28. The insulating member 87d is provided on the upper surface of the second small diameter end portion 52. The second cylindrical portion 65 is subjected to the crimping process as described later to form a joint portion 89b. The joint portion 89b holds the second small diameter end portion 52 such that the insulating members 87c, 87d are interposed between the second small diameter end portion 52 and the joint portion 89b. For example, the insulating members 87a to 87d are thin plates of mica material.

As shown in FIG. 1, the fuel cell stack 12 includes end plates 90a, 90b provided at opposite ends of the fuel cells 10 in the stacking direction. The end plate 90a or the end plate 90b is electrically insulated from tightening bolts 98. A first pipe 92 and a second pipe 94 extend through the end plate 90a. The first pipe 92 is connected to the fuel gas supply passage 36 extending through the fuel cells 10, and the second pipe 94 is connected to the oxygen-containing gas supply passage 50 extending through the fuel cells 10.

The end plates 90a, 90b have bolt holes 96 at positions above and under the fuel gas supply passage 36, and at positions above and under the oxygen-containing gas supply passage 50. Tightening bolts 98 are inserted into the respective bolt holes 96, and tip ends of the respective tightening bolts 98 are screwed into nuts 99 for tightening the fuel cell stack 12.

Next, operation of the fuel cell stack 12 will be described below.

As shown in FIG. 2, in assembling the fuel cell 10, firstly, the first plate 30 of the separator 28 is joined to one surface of the third plate 34, and the second plate 32 is joined to the other surface of the third plate 34. Thus, the third plate 34 divides a space in the separator 28 to form the fuel gas channel 76 connected to the fuel gas supply passage 36 and the oxygen-containing gas channel 84 connected to the oxygen-containing gas supply passage 50 separately (see FIGS. 3, and 7 to 9).

Figure 10:
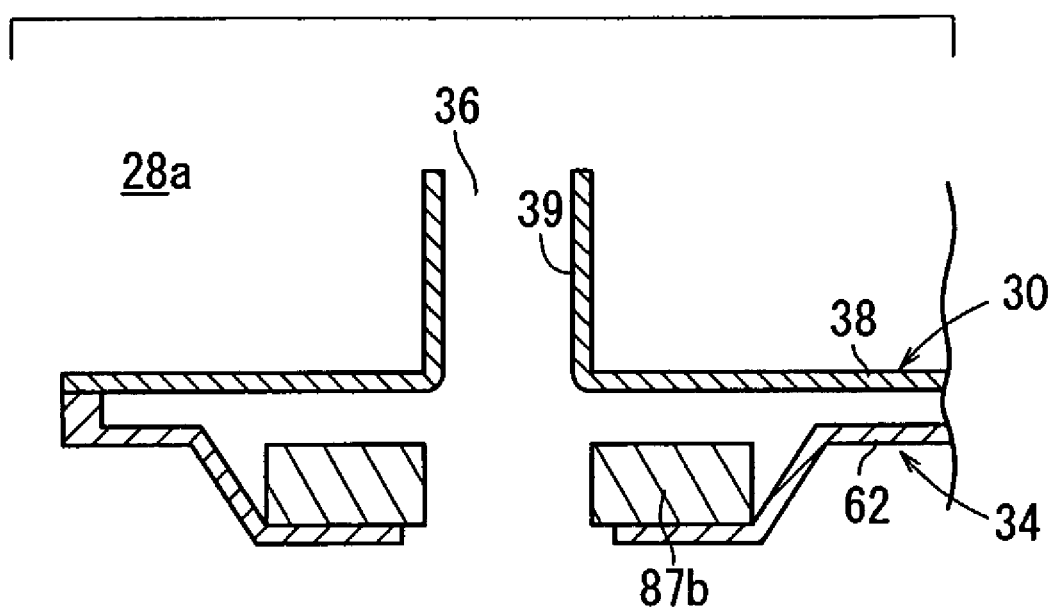
FIG. 10 is a view showing a crimping process for the separator.

Then, the separators 28 and the electrolyte electrode assemblies 26 are stacked alternately. One separator 28 and the other separator 28 are plastically deformed to form the joint portions 89a, 89b. Specifically, as shown in FIG. 10, firstly, in a separator 28a (one separator 28), the insulating member 87b is provided on the third small diameter end portion 62 of the third plate 34 around the fuel gas supply passage 36.

Figure 11:
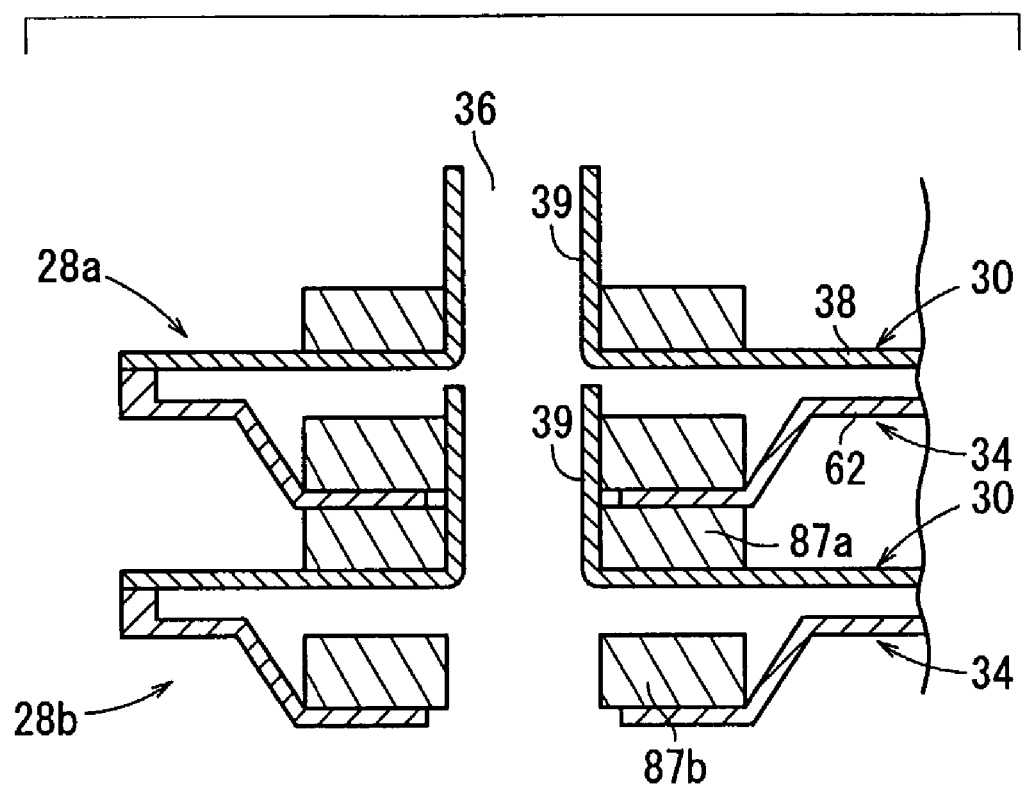
FIG. 11 is a view showing the crimping process for the separator after the state in FIG. 10.

As shown in FIG. 11, a separator 28b (the other separator 28) is stacked on the separator 28a. In the separator 28b, the insulating member 87a is provided on the first small diameter end portion 38 of the first plate 30 around the fuel gas supply passage 36, and the insulating member 87b is provided on the third small diameter end portion 62 of the third plate 34 around the fuel gas supply passage 36. At this time, the first cylindrical portion 39 of the separator 28b is inserted into the hole as the fuel gas supply passage 36 of the separator 28a.

Figure 12:
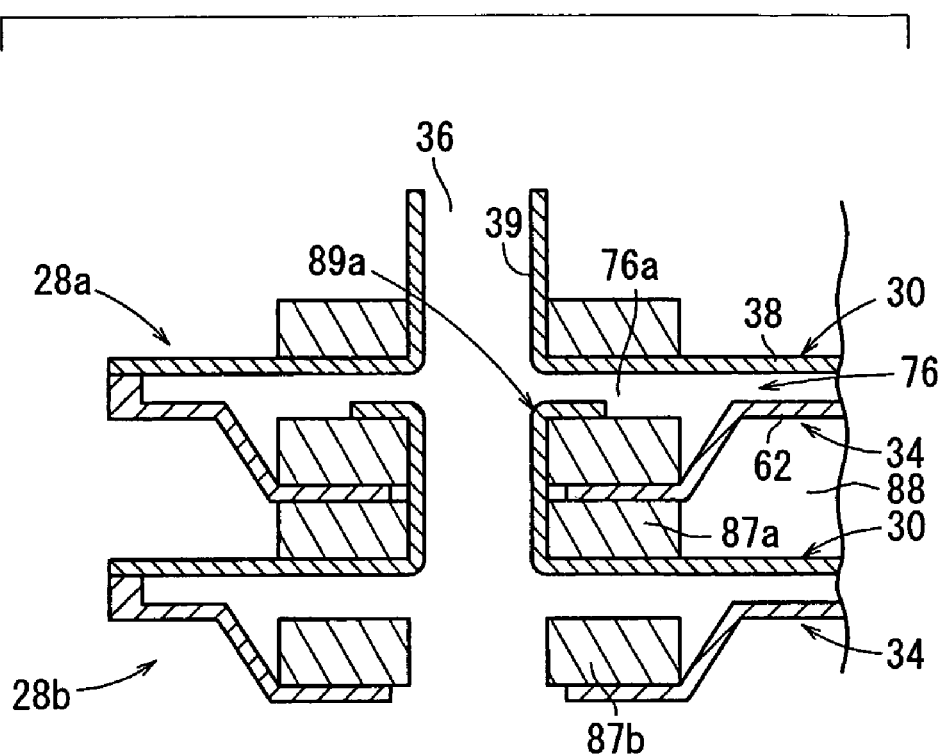
FIG. 12 is a view showing the crimping process for the separator after the state in FIG. 11.

As shown in FIG. 12, the first cylindrical portion 39 of the separator 28b and the third small diameter end portion 62 of the separator 28a are subjected to the crimping process to form the joint portion 89a. At the joint portion 89a, the third small diameter end portion 62 is tightened by the first small diameter end portion 38 through the insulating members 87a, 87b provided on both surfaces of the third small diameter end portion 62. Thus, the space between the separators 28a, 28b is sealed hermetically. That is, the fuel gas supply passage 36 is sealed hermetically from the oxygen-containing gas pressure chamber 88, and only connected to the fuel gas distribution passage 76a.

Though not shown, at the joint portion 89b, as in the case of the joint portion 89a, the second cylindrical portion 65 is subjected to the crimping process. The second small diameter end portion 52 is tightened by the fourth small diameter end portion 64 through the insulating members 87c, 87d provided on both surfaces of the second small diameter end portion 52. Thus, the oxygen-containing gas supply passage 50 is sealed hermetically from the fuel gas pressure chamber 86, and connected only to the oxygen-containing gas distribution passage 84a.

A predetermined number of separators 28a, 28b are subjected to the crimping process in the manner as described above to combine the fuel cells 10 together. Then, the end plates 90a, 90b are provided at the opposite ends of the fuel cells 10 in the stacking direction. The end plate 90a or the end plate 90b is electrically insulated from the tightening bolts 98. The tightening bolts 98 are inserted into the respective bolt holes 96 of the end plates 90a, 90b, and the tip ends of the tightening bolts 98 are screwed into the nuts 99 to form the fuel cell stack 12 (see FIG. 1).

A fuel gas produced by reforming, e.g., city gas is supplied to the first pipe 92 connected to the end plate 90a, and flows from the first pipe 92 to the fuel gas supply passage 36. The oxygen-containing gas (hereinafter also referred to as the "air") is supplied to the second pipe 94 connected to the end plate 90a, and flows from the second pipe 94 to the oxygen-containing gas supply passage 50.

As shown in FIG. 7, after the fuel gas flows into the fuel gas supply passage 36, the fuel gas flows in the stacking direction indicated by the arrow A, and is supplied to the fuel gas channel 76 in the separator 28 in each of the fuel cells 10. The fuel gas flows along the fuel gas channel 76, and flows into the fuel gas pressure chamber 86 between the first and third circular disks 42, 70. Thus, the fuel gas flows between the third protrusions 78 in the fuel gas pressure chamber 86, and flows into the fuel gas inlet 48 at the central position of the first circular disk 42.

Figure 9:
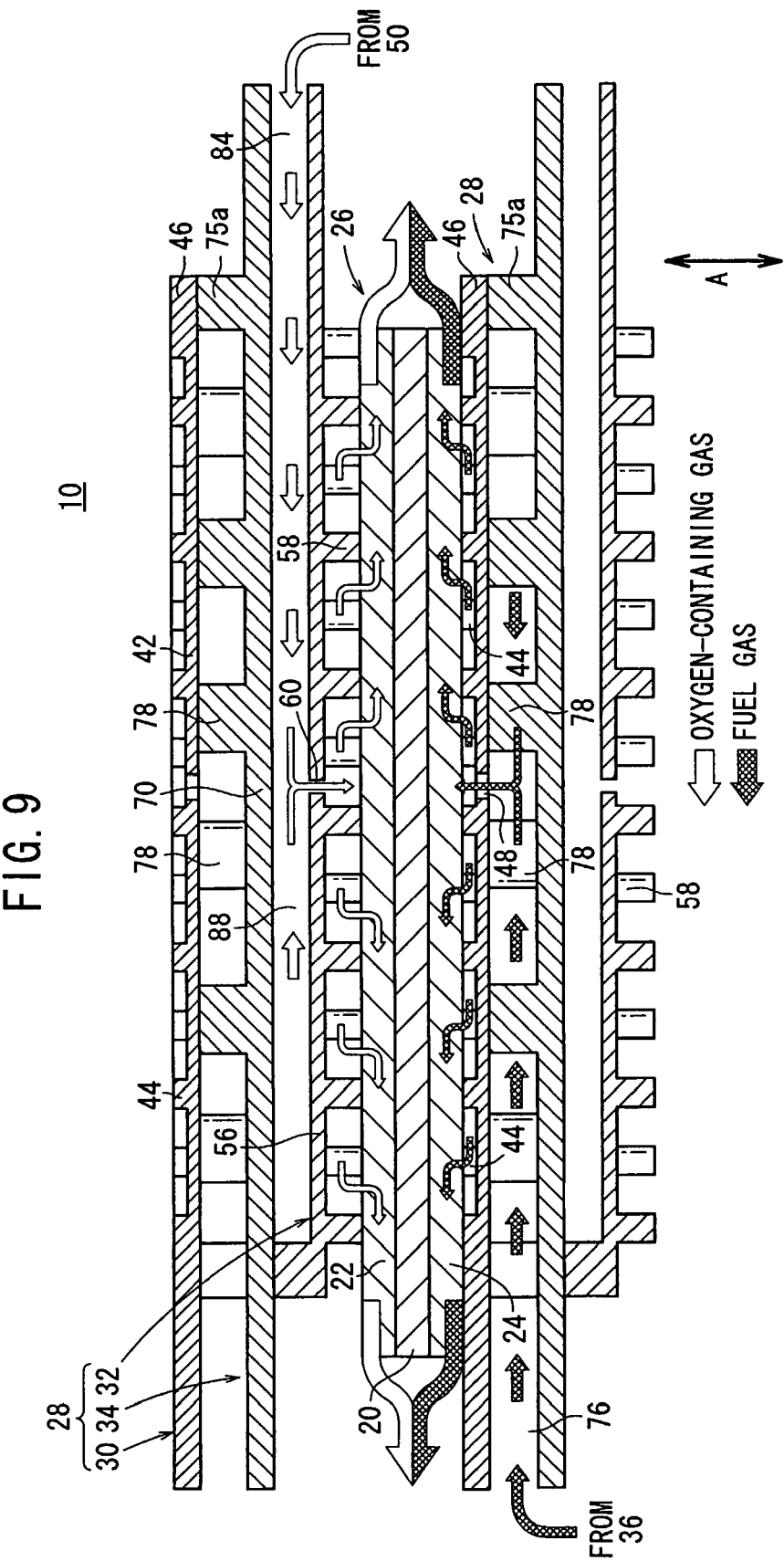
FIG. 9 is a cross sectional view schematically showing operation of the fuel cell.

The fuel gas inlet 48 is provided at a position corresponding to the central position of the anode 24 in each of the electrolyte electrode assemblies 26. Therefore, as shown in FIG. 9, the fuel gas from the fuel gas inlet 48 is supplied to the anode 24, and flows outwardly from the central region of the anode 24.

As shown in FIG. 8, after the air flows into the oxygen-containing gas supply passage 50, the air flows through the oxygen-containing gas channel 84 in the separator 28, and is supplied to the oxygen-containing gas pressure chamber 88 between the second and third circular disks 56, 70. The air flows into the oxygen-containing gas inlet 60 at the central position of the second circular disk 56.

The oxygen-containing gas inlet 60 is provided at a position corresponding to the central position of the cathode 22 in each of the electrolyte electrode assemblies 26. Therefore, as shown in FIG. 9, the air from the oxygen-containing gas inlet 60 is supplied to the cathode 22, and flows outwardly from the central region of the cathode 22.

Thus, in each of the electrolyte electrode assemblies 26, the fuel gas is supplied from the central region of the anode 24 to the outer circumferential region of the anode 24, and the air is supplied from the central region of the cathode 22 to the outer circumferential region of the cathode 22 for generating electricity. After the fuel gas and the air are consumed in the power generation, the fuel gas and the air are discharged as an exhaust gas from the outer circumferential regions of the first through third circular disks 42, 56, and 70.

In the first embodiment, as shown in FIG. 7, the first cylindrical portion 39 is subjected to the crimping process such that the joint portion 89a as a predetermined overlapping portion is formed integrally with one separator 28 and the other separator 28. The joint portion 89a hermetically holds the third small diameter end portion 62 such that the insulating members 87a, 87b are interposed between the joint portion 89a and the third small diameter end portion 62. Likewise, as shown in FIG. 8, the second cylindrical portion 65 is subjected to the crimping process such that the joint portion 89b as a predetermined overlapping portion is formed integrally with one separator 28 and the other separator 28. The joint portion 89b hermetically holds the second small diameter end portion 52 such that the insulating members 87c, 87d are interposed between the joint portion 89b and the second small diameter end portion 52.

Thus, at the joint portions 89a, 89b, no glass seal members are required, and no degradation of sealing performance due to the degradation of the seal members occurs. Accordingly, in the first embodiment, with the simple and economical structure, the desired sealing performance is achieved reliably.

Further, no glassy seal members having heat resistance and flexibility are required. Therefore, shattering or volatilization of the seal members does not occur. Improvement in the sealing reliability and durability in the joint portions 89a, 89b is achieved suitably. Any material can be adopted for the insulating members 87a to 87d as long as the insulating function can be provided. Thus, the material for the insulating members 87a to 87d can be selected from a variety of materials, and improvement in the heat resistance is achieved easily.

Further, no load needs to be applied to the joint portions 89a, 89b for improving the sealing performance. Thus, it is possible to prevent damage (degradation) of the separators 28 or damage or the like of the electrolyte electrode assemblies 26 that would otherwise occur due to the load application. Further, no excessive stress is generated at the joint portions 89a, 89b. The desired sealing performance is maintained, and improvement in the reliability is achieved. Further, no load mechanism for applying the load is required. Accordingly, reduction in the overall weight and heat capacity of the fuel cell stack 12 is achieved easily.

Figure 13:
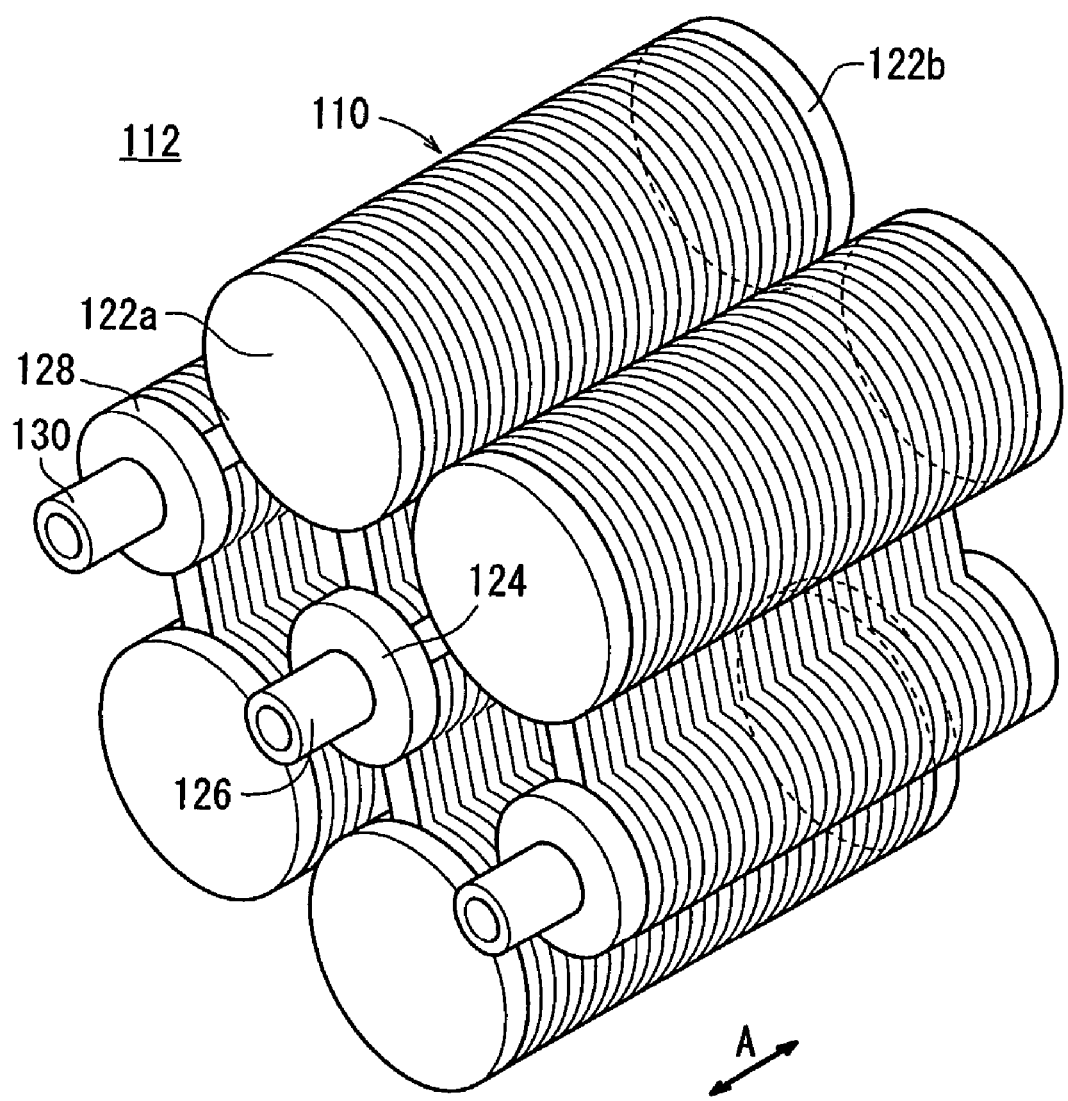
FIG. 13 is a perspective view schematically showing a fuel cell stack formed by stacking a plurality of fuel cells according to a second embodiment of the present invention.
Figure 14:
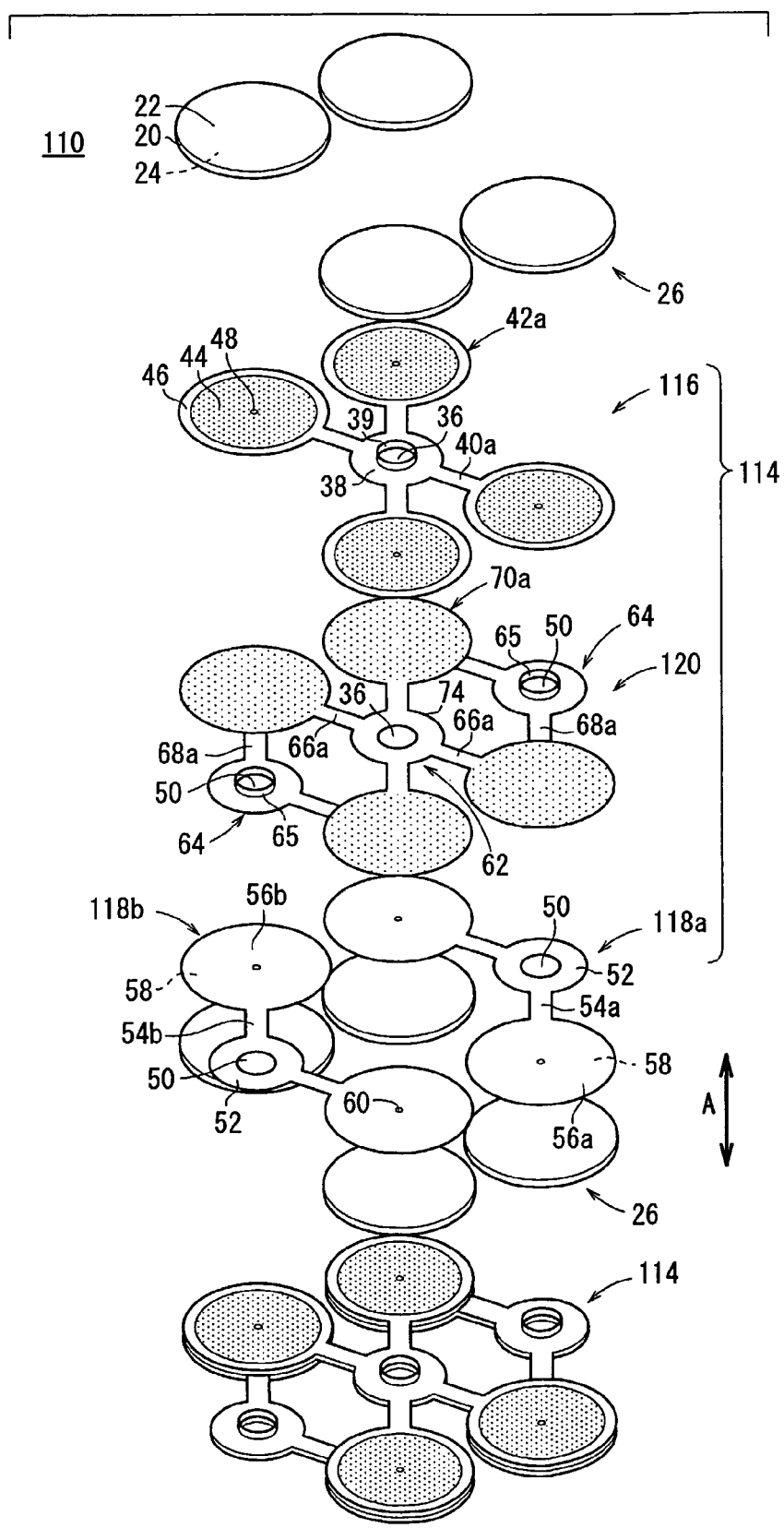
FIG. 14 is an exploded perspective view showing the fuel cell.

FIG. 13 is a perspective view schematically showing a fuel cell stack 112 formed by stacking a plurality of fuel cells 110 according a second embodiment of the present invention indicated by an arrow A. FIG. 14 is an exploded perspective view showing the fuel cell 110. The constituent elements that are identical to those of the fuel cell 10 and the fuel cell stack 12 according to the first embodiment are labeled with the same reference numeral, and description thereof will be omitted.

Figure 15:
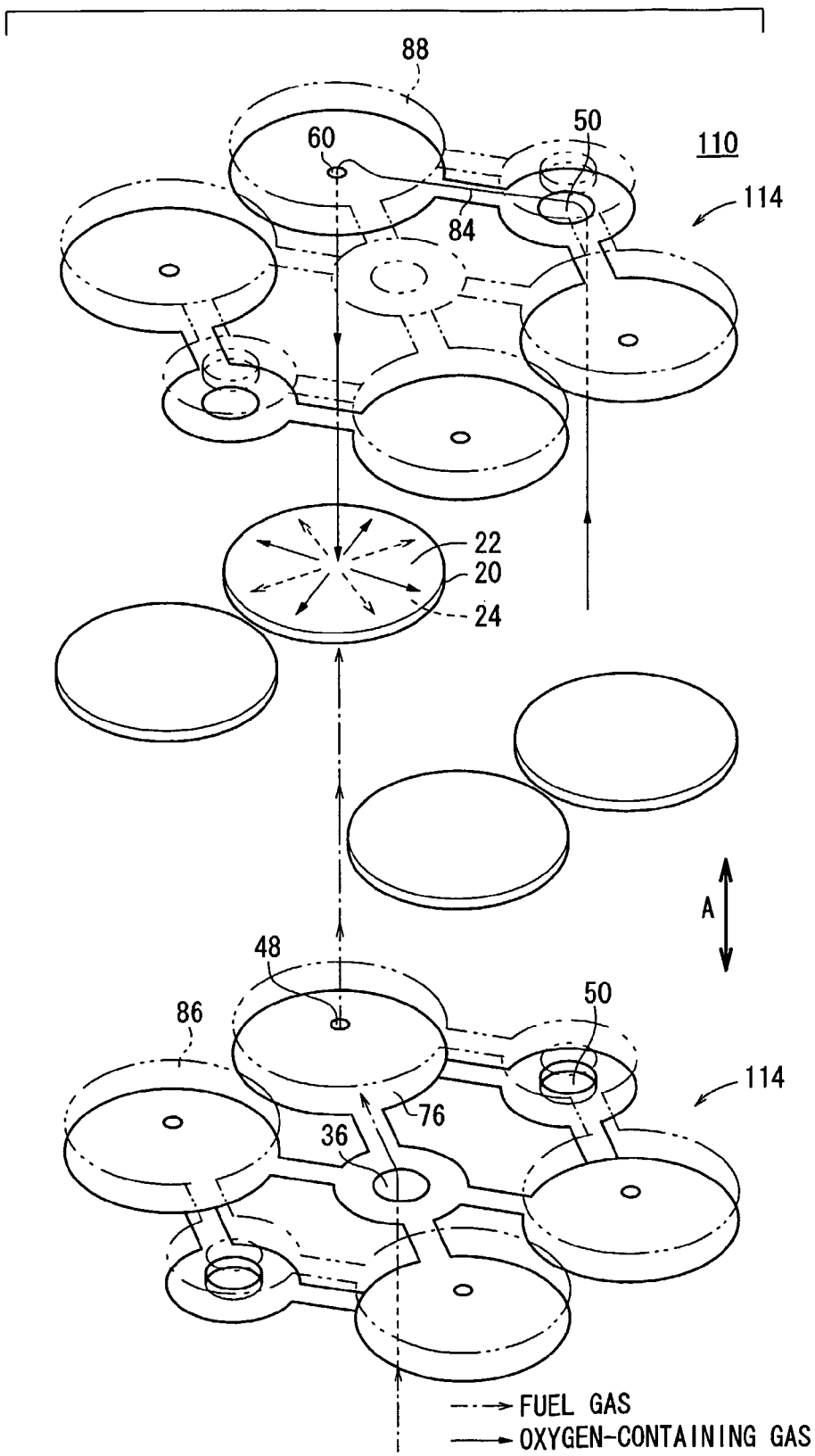
FIG. 15 is a partial exploded perspective view showing gas flows in the fuel cell.

As shown in FIGS. 14 and 15, four electrolyte electrode assemblies 26 are sandwiched between separators 114. Each of the separators 114 includes a first plate 116, a pair of second plates 118a, 118b, and a third plate 120. For example, the first to third plates 116, 118a, 118b, and 120 are metal plates of, e.g., stainless alloy. The first plate 116 and the second plates 118a, 118b are joined to both surfaces of the third plate 120 by brazing, for example.

The first plate 116 has a first small diameter end portion 38. A fuel gas supply passage 36 extends through the first small diameter end portion 38. The first small diameter end portion 38 is integral with four first circular disks 42a each having a relatively large diameter through four narrow bridges 40a. At the first small diameter end portion 38, a first cylindrical portion 39 for crimping is formed around the fuel gas supply passage 36. The first cylindrical portion 39 protrudes in the direction indicated by the arrow A.

The second plates 118a, 118b include second small diameter end portions 52, respectively. Oxygen-containing gas supply passages 50 extend through the second small diameter end portions 52, respectively. Each of the second small diameter end portions 52 is integral with two second circular disks 56a, 56b each having a relatively large diameter through two narrow bridges 54a, 54b.

The third plate 120 has a third small diameter end portion 62 and two fourth small diameter end portions 64. The oxygen-containing gas supply passages 50 extend through the fourth small diameter end portions 64, respectively. The third small diameter end portion 62 is integral with four third circular disks 70a each having a relatively large diameter through four narrow bridges 66a.

Each of the fourth small diameter end portions 64 are integral with the third circular disks 70a through two narrow bridges 68a, i.e., the two fourth small diameter end portions 64 are integral with the four third circular disks 70a. At each of the fourth small diameter end portions 64, a second cylindrical portion 65 for crimping is formed around the oxygen-containing gas supply passage 50. The second cylindrical portion 65 protrudes in the direction indicated by the arrow A.

Fuel gas channels 76 are formed in the third circular disks 70a, respectively. Each of the fuel gas channels 76 forms a fuel gas pressure chamber 86 over the electrode surface of the anode 24 such that the first circular disk 42a of the first plate 116 is interposed between the fuel gas pressure chamber 86 and the anode 24.

As shown in FIG. 13, the fuel cell stack 112 includes four end plates 122a and four end plates 122b provided at opposite ends of the fuel cells 110 in the stacking direction. A plate 124 is provided at the position of the fuel gas supply passage 36. A pipe 126 for supplying the fuel gas to the fuel gas supply passage 36 is connected to the plate 124. Two plates 128 are provided at the positions of the oxygen-containing gas supply passages 50. Pipes 130 for supplying the air are connected to the plates 128.

In the second embodiment, the fuel gas is supplied to the fuel gas supply passage 36 in the fuel cell stack 112 through the pipe 126, and the air is supplied to the oxygen-containing gas supply passages 50 in the fuel cell stack 112 through the pipes 130.

As shown in FIG. 15, the fuel gas supplied to the fuel gas supply passage 36 flows in the stacking direction into the four fuel gas channels 76 in the separator 114 in each of the fuel cells 110. The fuel gas flows along the fuel gas channels 76, and flows into the fuel gas pressure chambers 86 formed between the first and third circular disks 42a, 70a. The fuel gas is supplied to the central positions of the respective anodes 24 of the electrolyte electrode assemblies 26 through the fuel gas inlets 48.

The air supplied to the two oxygen-containing gas supply passages 50 flows through the oxygen-containing gas channels 84 in the separator 114. Then, the air is supplied to the oxygen-containing gas pressure chambers 88 formed between the second and third circular disks 56a, 56b, 70a, 70b. The air flows into the central regions of the respective cathodes 22 of the electrolyte electrode assemblies 26 through the oxygen-containing gas inlets 60 provided at the central positions of the second circular disks 56a, 56b.

In one separator 114 and the other separator 114, as in the case of the first embodiment, the first and second cylindrical portions 39, 65 are subjected to the crimping process to form predetermined overlapping portions. Thus, in the second embodiment, the same advantages as in the case of the first embodiment can be obtained. For example, with the simple and compact structure, it is possible to prevent damage (degradation) of the separators 114 or damage or the like of the electrolyte electrode assemblies 26.

Figure 16:
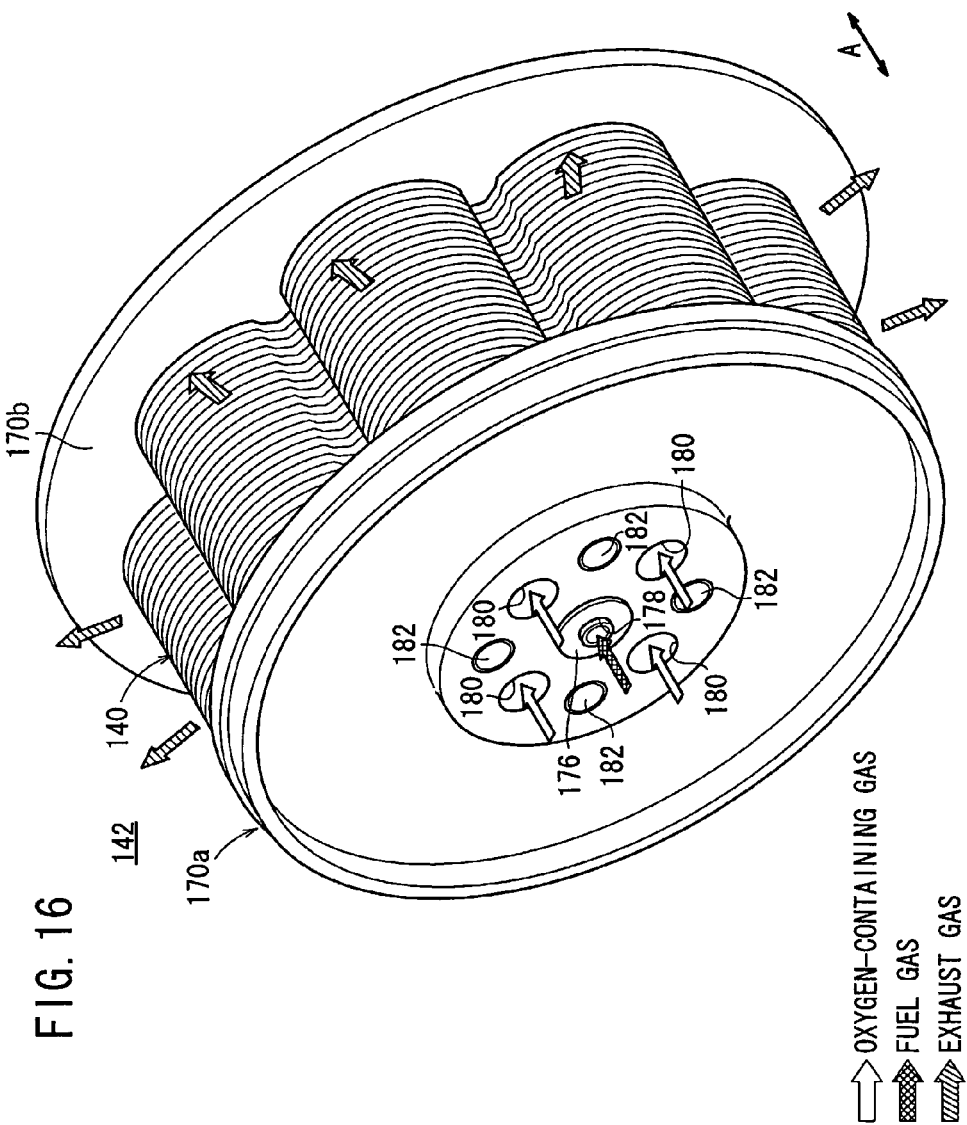
FIG. 16 is a perspective view schematically showing a fuel cell stack formed by stacking a plurality of fuel cells according to a third embodiment of the present invention.

FIG. 16 is a perspective view schematically showing a fuel cell stack 142 formed by stacking a plurality of fuel cells 140 according to a third embodiment of the present invention in a direction indicated by an arrow A.

Figure 17:
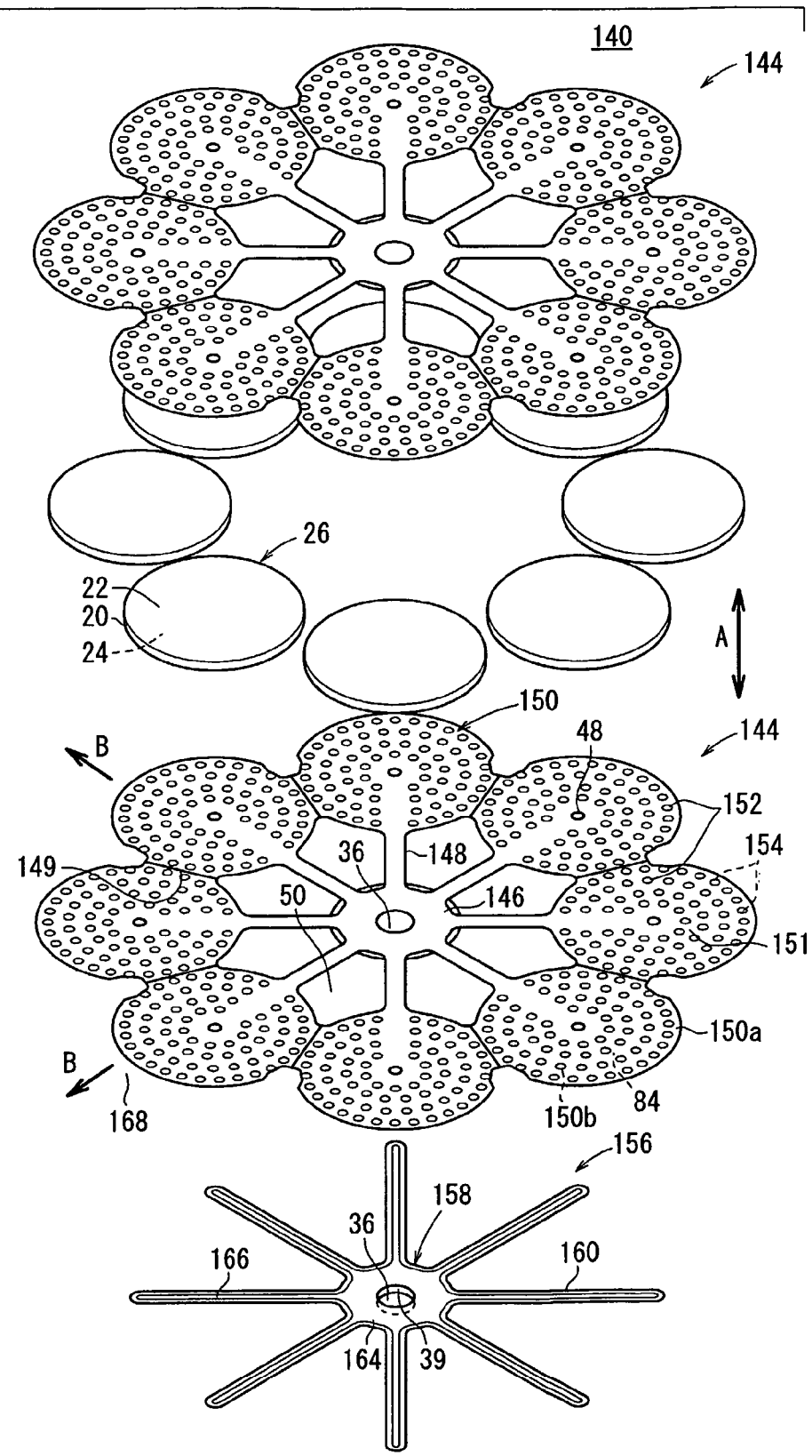
FIG. 17 is an exploded perspective view showing the fuel cell.
Figure 18:
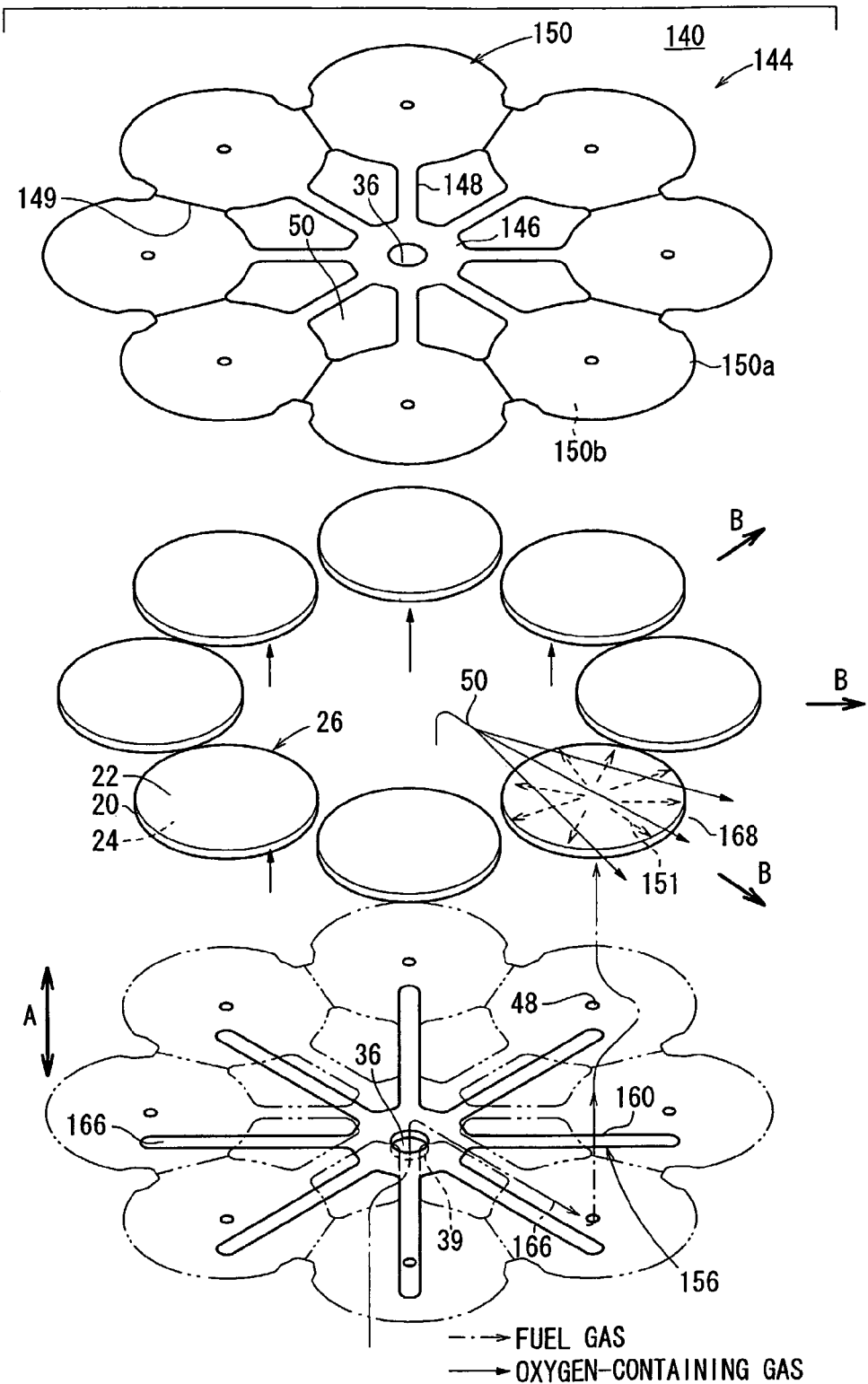
FIG. 18 is a partial exploded perspective view showing gas flows in the fuel cell.

As shown in FIGS. 17 and 18, a plurality of, e.g., eight electrolyte electrode assemblies 26 are interposed between a pair of separators 144.to form the fuel cell 140. For example, each of the separators 144 (first member) comprises a single metal plate of, e.g., stainless alloy or a carbon plate. The separator 144 has a first small diameter end portion 146. A fuel gas supply passage 36 extends through the center of the first small diameter end portion 146.

The first small diameter end portion 146 is integral with circular disks 150 each having a relatively large diameter through a plurality of first bridges 148. The first bridges 148 extend radially outwardly from the first small diameter end portion 146 at equal angles (intervals). The circular disk 150 and the electrolyte electrode assembly 26 have substantially the same size. The adjacent circular disks 150 are separated from each other through slits 149.

Each of the circular disks 150 has first protrusions 152 on its surface 150a which contacts the anode 24. The first protrusions 152 form a fuel gas channel 151 for supplying a fuel gas along an electrode surface of the anode 24. Each of the circular disks 150 has second protrusions 154 on its surface 150b which contacts the cathode 22. The second protrusions 154 form an oxygen-containing gas channel 84 for supplying the oxygen-containing gas along an electrode surface of the cathode 22.

Figure 19:
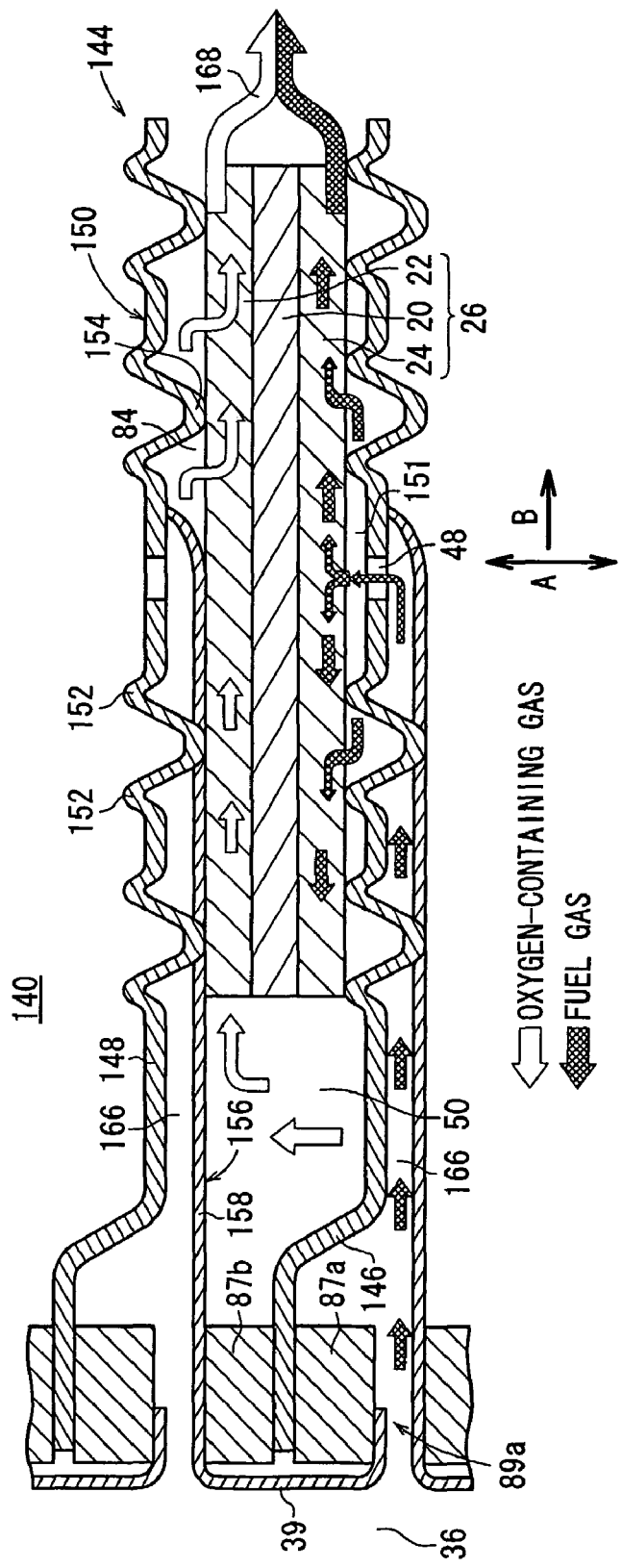
FIG. 19 is a cross sectional view schematically showing operation of the fuel cell.

As shown in FIG. 19, the first protrusions 152 and the second protrusions 154 protrude away from each other. The first protrusions 152 are ring shaped protrusions, and the second protrusions 154 are mountain shaped protrusions. The second protrusions (mountain shaped protrusions) 154 are surrounded by the first protrusions (ring shaped protrusions) 152.

As shown in FIGS. 17 to 19, a fuel gas inlet 48 is provided in each of the circular disks 150. The fuel gas flows through the fuel gas inlet 48 into the fuel gas channel 151. The position of the fuel gas inlet 48 is determined so that the fuel gas can be distributed uniformly. For example, the fuel gas inlet 48 is provided at substantially the center of the circular disk 150.

A channel member (second member) 156 is fixed to the separator 144 by brazing, laser welding or the like on a surface facing the cathode 22. As shown in FIG. 17, the channel member 156 includes a second small diameter end portion 158. The fuel gas supply passage 36 extends through the center of the second small diameter end portion 158. A first cylindrical portion 39 is formed around the fuel gas supply passage 36. The first cylindrical portion 39 protrudes in the direction indicated by the arrow A, i.e., in the direction away from the separator 144 joined to the channel member 156.

Eight second bridges 160 extend radially from the second small diameter end portion 158. Each of the second bridges 160 is fixed to the separator 144, from the first bridge 148 to the fuel gas inlet 48 of the circular disk 150.

A recess 164 is formed on the second small diameter end portion 158 of the channel member 156. The recess 164 is formed on a surface of the second small diameter end portion 158 which is joined to the separator 144. The recess 164 is connected to the fuel gas supply passage 36. A fuel gas supply channel 166 is formed between the first and second bridges 148, 160. The fuel gas supply channel 166 is connected to the fuel gas channel 151 through the recess 164.

As shown in FIG. 19, the oxygen-containing gas channel 84 is connected to an oxygen-containing gas supply passage 50. The air is supplied in the direction indicated by the arrow B through the space between the inner circumferential edge of the electrolyte electrode assembly 26 and the inner circumferential edge of the circular disk 150. The oxygen-containing gas supply passage 50 is formed by spaces between the first bridges 148 inside the respective circular disks 150, and extends in the stacking direction.

Ring shaped insulating members 87a, 87b are provided on both surfaces of the first small diameter end portion 146 around the fuel gas supply passage 36. The first cylindrical portion 39 is subjected to a crimping process to form a joint portion 89a. The joint portion 89a hermetically holds the first small diameter end portion 146 such that the insulating members 87a, 87b are interposed between the first small diameter end portion 146 and the joint portion 89a. In the fuel cells 140, an exhaust gas channel 168 is formed outside the respective circular disks 150.

As shown in FIG. 16, the fuel cell stack 142 includes a plurality of fuel cells 140 stacked together, and end plates 170a, 170b provided at opposite ends in the stacking direction. The end plate 170a has a substantially circular disk shape. A columnar protrusion 176 is provided at the center of the end plate 170a. A hole 178 is formed at the center of the protrusion 176.

In the end plate 170a, holes 180 and screw holes 182 are formed alternately along a virtual circle around the protrusion 176 at equal angles (intervals). The holes 180 are connected to the oxygen-containing gas supply passage 50. Tightening bolts (not shown) are screwed into the screw holes 182 for tightening, and fixing the fuel cell stack 142.

Operation of the fuel cell stack 142 will be described below.

As shown in FIG. 17, in assembling the fuel cell 140, firstly, the separator 144 is joined to the channel member 156 on its surface facing the cathode 22. Therefore, the fuel gas supply channel 166 connected to the fuel gas supply passage 36 is formed between the separator 144 and the channel member 156. The fuel gas supply channel 166 is connected to the fuel gas channel 151 through the fuel gas inlet 48 (see FIG. 19).

Then, the separators 144 and the electrolyte electrode assemblies 26 are stacked alternately. One separator 144 and the other separator 144 are plastically deformed to form the joint portions 89a. The joint portion 89a is folded back for sandwiching the insulating members 87a, 87b. In this manner, the fuel cell 140 is fabricated. After a plurality of the fuel cells 140 are stacked in the direction indicated by the arrow A, the end plates 170a, 170b are provided at opposite ends of the fuel cells 140 in the stacking direction. Components between the end plates 170a, 170b are tightened together by tightening bolts (not shown).

In the fuel cell stack 142, as shown in FIG. 16, the fuel gas is supplied into the fuel gas supply passage 36 through the hole 178 of the fuel cell stack 142. The fuel gas flows in the direction indicated by the arrow A, and flows into the fuel gas supply channel 166 in the separator 144 in each of the fuel cells 140 (see FIG. 19).

The fuel gas flows along the fuel gas supply channel 166 between the first and second bridges 148, 160, and flows into the fuel gas channel 151 through the fuel gas inlet 48 formed in the circular disk 150. Thus, the fuel gas is supplied to substantially the central region of the anode 24 from the fuel gas inlet 48. The fuel gas flows along the fuel gas channel 151 toward the outer circumferential region of the anode 24.

As shown in FIG. 16, the air flows through the holes 180, and is supplied to the oxygen-containing gas supply passage 50 extending through substantially the center of the respective fuel cells 140. The air flows into the space between the inner circumferential edge of the electrolyte electrode assembly 26 and the inner circumferential edge of the circular disk 150 in the direction indicated by the arrow B, and flows toward the oxygen-containing gas channel 84 (see FIG. 18). As shown in FIG. 19, in the oxygen-containing gas channel 84, the air flows from the inner circumferential edge (central region of the separator 144) to the outer circumferential edge (outer region of the separator 144), i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B on the electrode surface of the cathode 22. At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 168 in the stacking direction. Then, the exhaust gas is discharged to the outside.

In the third embodiment, the first cylindrical portion 39 is subjected to the crimping process such that a predetermined overlapping portion is formed integrally with one separator 144 and the other separator 144. Thus, the same advantages as in the cases of the first and second embodiments can be obtained. For example, it is possible to prevent damage (degradation) of the separators 144 or damage or the like of the electrolyte electrode assemblies 26.

Figure 20:
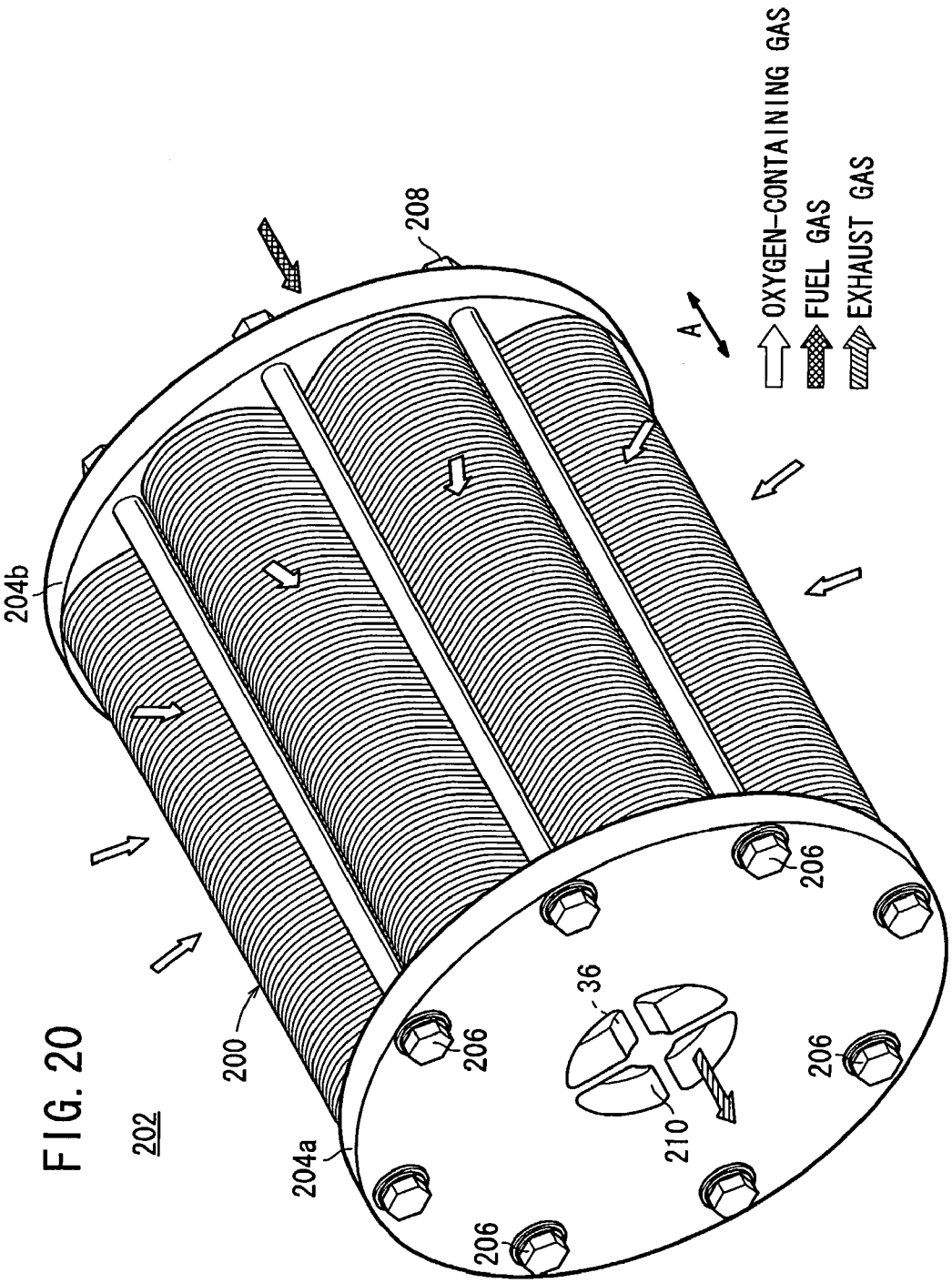
FIG. 20 is a perspective view schematically showing a fuel cell stack formed by stacking a plurality of fuel cells according to a fourth embodiment of the present invention.

FIG. 20 is a perspective view schematically showing a fuel cell stack 202 formed by stacking a plurality of fuel cells 200 according to a fourth embodiment of the present invention in a direction indicated by an arrow A.

The fuel cells 200 of the fuel cell stack 202 are stacked in a direction indicated by the arrow A. Each of the fuel cells 200 has a shape of a circular disk having a curved outer section. At opposite ends of the fuel cells 200 in the stacking direction, end plates 204a, 204b are provided. For example, a plurality of, e.g., eight tightening bolts 206 and nuts 208 are used for tightening components of the fuel cells 200 between the end plates 204a, 204b. At the center of the fuel cell stack 202, a circular fuel gas supply passage 36 is formed. The fuel gas supply passage 36 has a bottom at the end plate 204a, and extends in the direction indicated by the arrow A. A plurality of, e.g., four exhaust gas passages 210 are formed around the fuel gas supply passage 36 in the fuel cell stack 202. The exhaust gas passages 210 have bottoms at the end plate 204b, and extend in the direction indicated by the arrow A.

Figure 21:
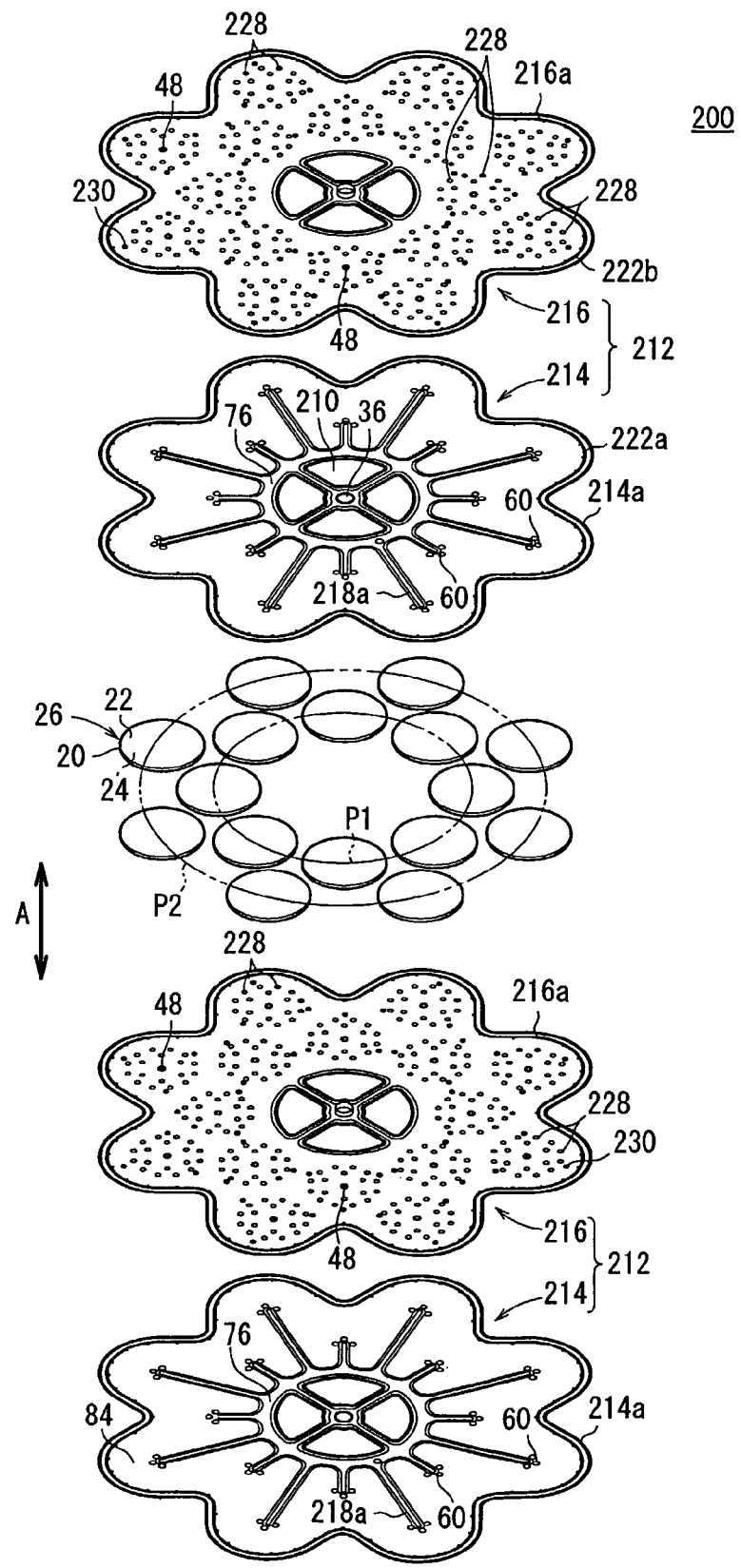
FIG. 21 is an exploded perspective view showing the fuel cell.
Figure 22:
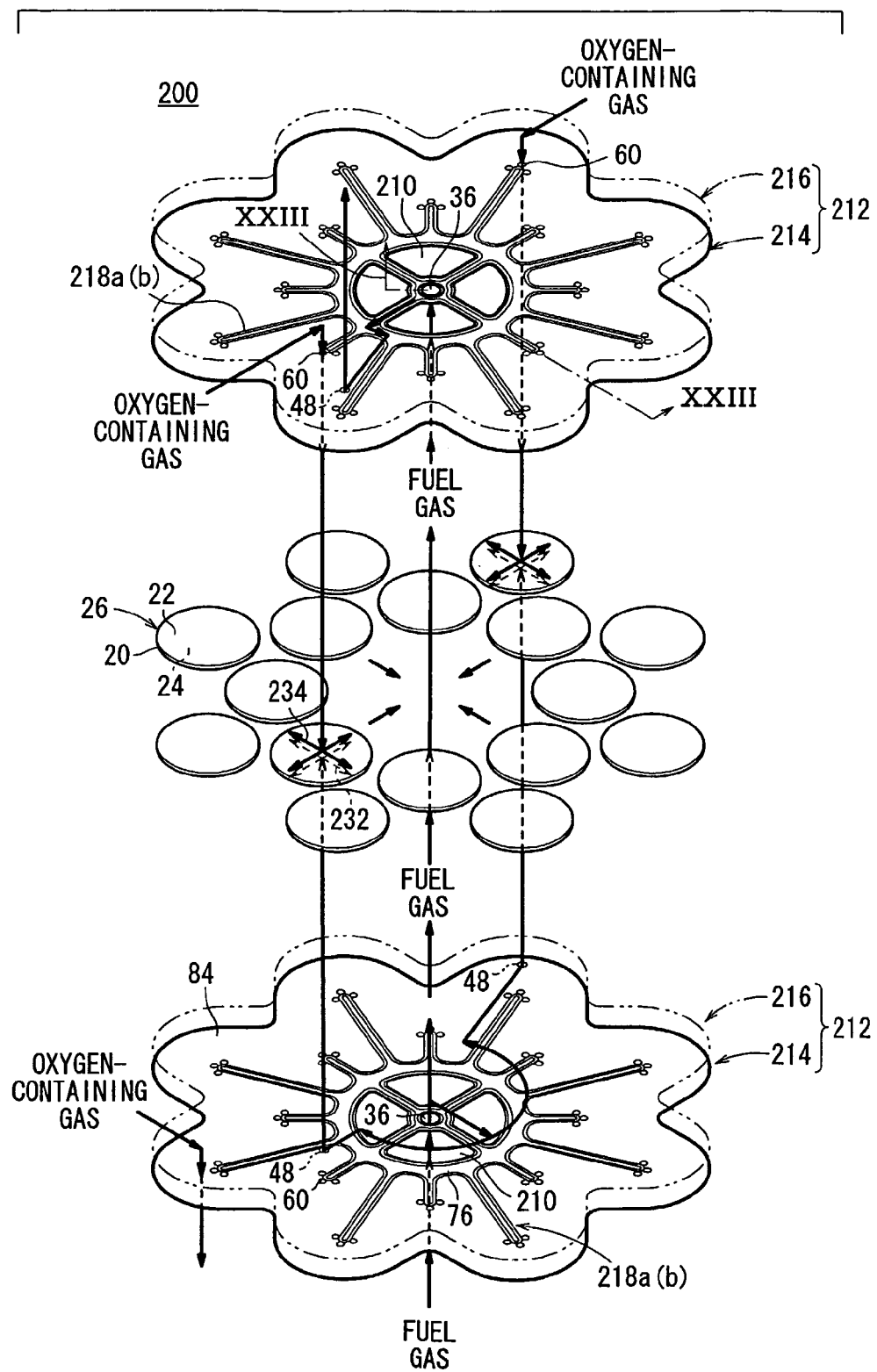
FIG. 22 is a partial exploded perspective view showing gas flows in the fuel cell.

As shown in FIGS. 21 and 22, a plurality of (e.g., 16) electrolyte electrode assemblies 26 are interposed between a pair of separators 212 to form the fuel cell 200. The electrolyte electrode assemblies 26 are arranged along an inner circle P1 and an outer circle P2 which are concentric with the fuel gas supply passage 36 formed at the center of the separators 212. The inner circle P1 passes through centers of eight inner electrolyte electrode assemblies 26, and the outer circle P2 passes through centers of eight outer electrolyte electrode assemblies 26 (see FIG. 21).

Each of the separators 212 includes a plurality of (e.g., two) plates (first and second members) 214, 216 which are stacked together. Each of the plates 214, 216 is made of a stainless alloy, for example. Curved outer sections 214a, 216a are formed on the plates 214, 216, respectively.

Figure 23:
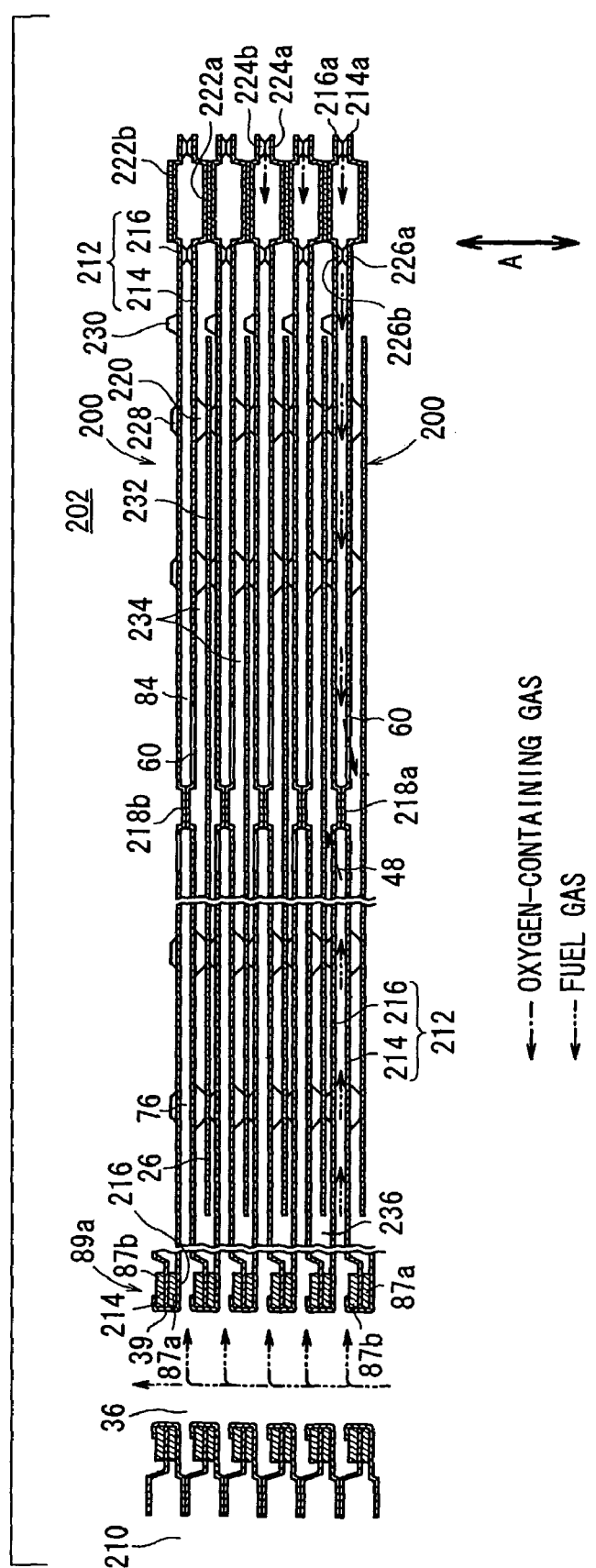
FIG. 23 is a cross sectional view showing the fuel cell.

As shown in FIG. 23, ring shaped insulating members 87a, 87b are formed on central regions of both surfaces of the plate 214 around the fuel gas supply passage 36. A first cylindrical portion 39 is provided at the center of the plate 216. The first cylindrical portion 39 is subjected to a crimping process to form a joint portion 89a.

An outer ridge 218a is formed radially outwardly around the fuel gas supply passage 36 on the plate 214. A fuel gas channel 76 is formed by the outer ridge 218a. The fuel gas channel 76 is connected to the fuel gas supply passage 36.

At each end portion of the outer ridge 218a, three oxygen-containing gas inlets 60 are formed. The oxygen-containing gas inlets 60 are formed to pass through the plate 214. The plate 214 has first bosses 220 protruding toward, and which contact the electrolyte electrode assemblies 26 arranged along the inner circle P1 and the outer circle P2.

As shown in FIGS. 21 and 23, a first curved circumferential ridge 222a is formed on the plate 214 along (inside) the curved outer section 214a. The first circumferential ridge 222a has the shape identical to the curved outer section 214a, and protrudes away from the plate 216. Outer projections 224a and inner projections 226a are provided at predetermined intervals on opposite sides of the first circumferential ridge 222a to face each other (or in a zigzag pattern).

An outer ridge 218b protruding toward the outer ridge 218a of the plate 214 is formed on the plate 216. The fuel gas channel 76 connected to the fuel gas supply passage 36 is formed between the plates 214, 216. Further, the plate 216 has second bosses 228 protruding toward, and which contact the electrolyte electrode assemblies 26 arranged along the inner circle P1 and the outer circle P2. The second bosses 228 have small dimensions (height and diameter) in comparison with the first bosses 220. Fuel gas inlets 48 are formed to pass through the plate 216. The fuel gas inlets 48 are connected to the fuel gas channel 76.

Protrusions 230 for positioning the eight electrolyte electrode assemblies 26 along the inner circle P1 and the eight electrolyte electrode assemblies 26 along the outer circle P2 are provided on the plate 216. At least three protrusions 230 are formed for each of the electrolyte electrode assemblies 26.

In the fourth embodiment, three protrusions 230 are formed for positioning one electrolyte electrode assembly 26, for example. The electrolyte electrode assembly 26 is positioned inside the protrusions 230, leaving a clearance between the protrusions 230 and the electrolyte electrode assembly 26. The height of the protrusions 230 is greater than the height of the second bosses 228 (see FIG. 23).

As shown in FIGS. 21 and 23, a second circumferential ridge 222b is formed on the plate 216 along (inside) the curved outer section 216a. The second circumferential ridge 222b has the shape identical to the curved outer section 216a, and protrudes away from the plate 214. Outer projections 224b and inner projections 226b are provided at predetermined intervals on opposite sides of the second circumferential ridge 222b to face each other (or in a zigzag pattern).

The fuel gas channel 76 is formed between the plate 214 and the plate 216. An oxygen-containing gas channel 84 is formed outside the outer ridges 218a, 218b between the plate 214 and the plate 216 (see FIGS. 23 and 24). The oxygen-containing gas channel 84 is connected to the oxygen-containing gas inlets 60 formed on the plate 214.

The electrolyte electrode assemblies 26 are interposed between the plate 214 of one separator 212 and the plate 216 of the other separator 212. Specifically, the plate 214 and the plate 216 outside the electrolyte electrode assemblies 26 has the first bosses 220 and the second bosses 228 protruding toward the electrolyte electrode assemblies 26 for sandwiching the electrolyte electrode assemblies 26.

Figure 24:
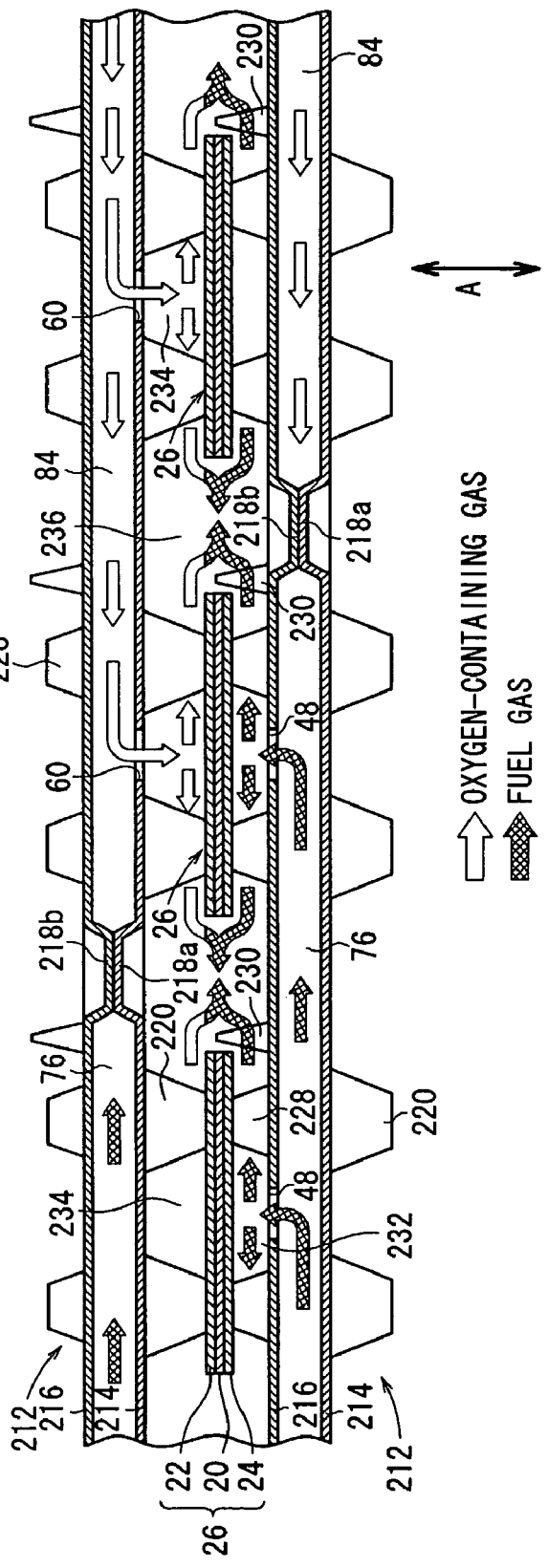
FIG. 24 is a cross sectional view schematically showing operation of the fuel cell.
Figure 25:
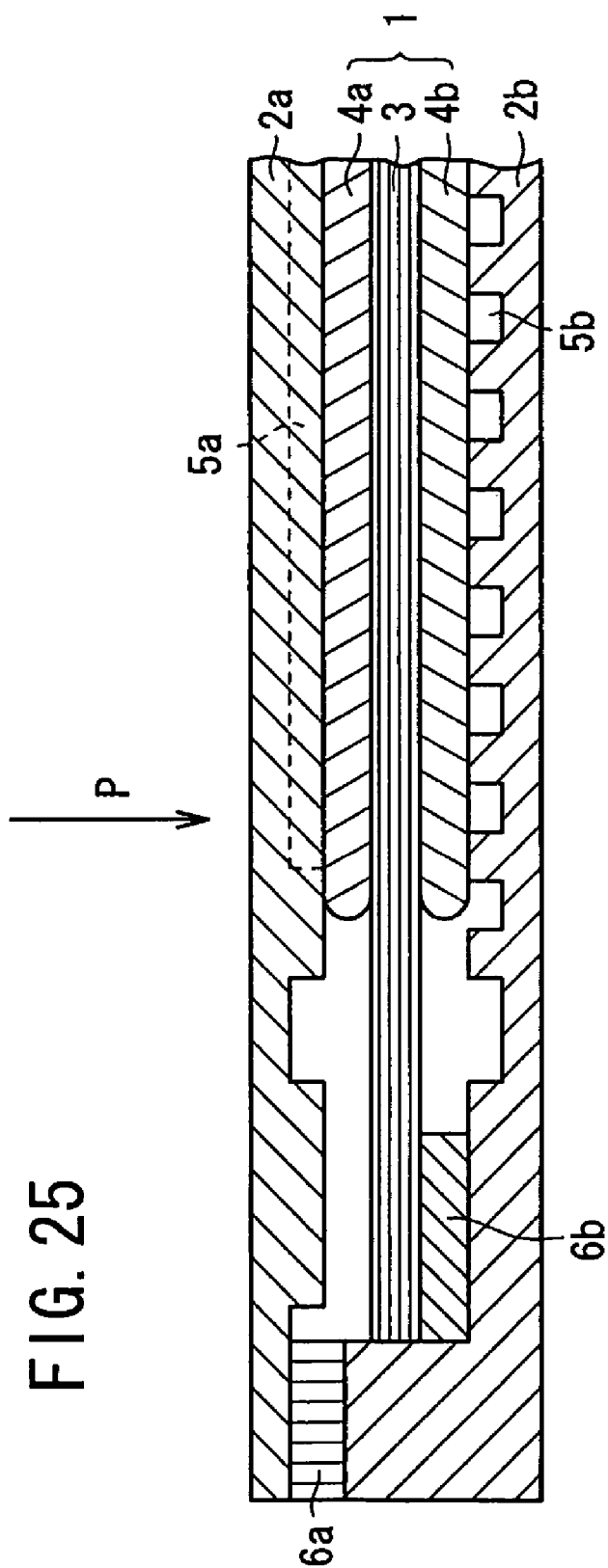
FIG. 25 is a perspective view schematically showing a conventional solid oxide fuel cell.

As shown in FIG. 24, a fuel gas flow passage 232 connected to the fuel gas channel 76 through the fuel gas inlets 48 is formed between the electrolyte electrode assemblies 26 and the plate 216 of the one separator 212. Further, an oxygen-containing gas flow passage 234 connected to the oxygen-containing gas channel 84 through the oxygen-containing gas inlets 60 is formed between the electrolyte electrode assemblies 26 and the plate 214 of the other separator 212. The size of the opening of the fuel gas flow passage 232 depends on the height of the second bosses 228. The size of the opening of the oxygen-containing gas flow passage 234 depends on the height of the first bosses 220. The flow rate of the fuel gas is smaller than the flow rate of the oxygen-containing gas. Therefore, the dimensions of the second bosses 228 are smaller than the dimensions of the first bosses 220.

As shown in FIG. 23, the fuel gas channel 76 is connected to the fuel gas supply passage 36 formed between the plates 214, 216 of the separator 212. The oxygen-containing gas channel 84 and the fuel gas channel 76 are formed on the same area inside the separator 212. The oxygen-containing gas channel 84 is open to the outside through the space between the first and second circumferential ridges 222a, 222b of the plates 214, 216 of the separator 212.

Each of the separators 212 stacked in the stacking direction has the first bosses 220 and the second bosses 228 for sandwiching the electrolyte electrode assemblies 26. The first bosses 220 and the second bosses 228 function as current collectors. The outer ridge 218a of the plate 214 contacts the outer ridge 218b of the plate 216 for serially connecting the fuel cells 200 in the direction indicated by the arrow A.

Next, operation of the fuel cell stack 202 will be described below.

In assembling the fuel cell 200, firstly, the plate 214 and the plate 216 are joined together to form the separator 212. The separator 212 thus formed has the fuel gas channel 76 and the oxygen-containing gas channel 84 on the same area between the plate 214 and the plate 216. The fuel gas channel 76 is connected to the fuel gas supply passage 36, and the oxygen-containing gas channel 84 between the curved outer section 214*a* and the curved outer section 216*a* is open to the outside.

Then, the electrolyte electrode assemblies 26 are interposed between a pair of separators 212. The plate 214 of one separator 212 and the plate 216 of the other separator 212 are plastically deformed to form the joint portions 89*a*. The joint portion 89*a* is folded back for sandwiching the insulating members 87*a*, 87*b*.

As shown in FIGS. 21 and 22, sixteen electrolyte electrode assemblies 26 are interposed between the plate 214 of one separator 212 and the plate 216 of the other separator 212. Eight electrolyte electrode assemblies 26 are arranged along the inner circle P1, and eight electrolyte electrode assemblies 26 are arranged along the outer circle P2.

Three protrusions 230 are provided for positioning each of the electrolyte electrode assemblies 26. The electrolyte electrode assembly 26 is placed inside the three protrusions 230. The first bosses 220 of the plate 214 and the second bosses 228 of the plate 216 protrude toward, and contact the electrolyte electrode assembly 26 inside the protrusions 230. Thus, the electrolyte electrode assembly 26 is sandwiched between the first bosses 220 of the plate 214 and the second bosses 228 of the plate 216.

As shown in FIG. 24, the oxygen-containing gas flow passage 234 is formed between the cathodes 22 of the electrolyte electrode assemblies 26 and the plate 214. The oxygen-containing gas flow passage 234 is connected to the oxygen-containing gas channel 84 through the oxygen-containing gas inlets 60. The fuel gas flow passage 232 is formed between the anodes 24 of the electrolyte electrode assemblies 26 and the plate 216. The fuel gas flow passage 232 is connected to the fuel gas channel 76 through the fuel gas inlets 48. A discharge channel 236 is formed between the separators 212 for guiding the exhaust gas (mixed gas of the fuel gas and the oxygen-containing gas after reaction) to the exhaust gas passages 210.

A plurality of the fuel cells 200 as assembled above are stacked in the direction indicated by the arrow A to form the fuel cell stack 202 (see FIG. 20).

The fuel gas is supplied to the fuel gas supply passage 36 in the fuel cell stack 202, and the air is supplied from the outside the fuel cell stack 202 under pressure. The fuel gas supplied to the fuel gas supply passage 36 flows in the stacking direction indicated by the arrow A, and is supplied to the fuel gas channel, 76 formed in each of the separators 212 of the fuel cells 200 (see FIG. 23).

As shown in FIG. 22, the fuel gas flows along the outer ridges 218*a*, 218*b*, and into the fuel gas flow passage 232 through the fuel gas inlets 48 formed at end portions of the outer ridges 218*a*, 218*b*. The fuel gas inlets 48 are formed at positions corresponding to central regions of the anodes 24 of the electrolyte electrode assemblies 26. The fuel gas supplied to the fuel gas flow passage 232 flows outwardly from the central regions of the anodes 24 (see FIG. 24).

The air is supplied to each of the fuel cells 200 from the outside. The air is supplied to the oxygen-containing gas channel 84 formed in each of the separators 212, between the plate 214 and the plate 216. The air supplied to the oxygen-containing gas channel 84 flows into the oxygen-containing gas flow passage 234 from the oxygen-containing gas inlets 60, and flows outwardly from central regions of the cathodes 22 of the electrolyte electrode assemblies 26 (see FIGS. 22 and 24).

Therefore, in each of the electrolyte electrode assemblies 26, the fuel gas is supplied to the central region of the anode 24, and flows outwardly from the central region of the anode 24. Likewise, the oxygen-containing gas is supplied to the central region of the cathode 22, and flows outwardly from the central region of the cathode 22. The oxygen-ions pass from the cathode 22 to the anode 24 through the electrolyte 20 to generate electricity by electrochemical reactions.

After reaction of the fuel gas and the oxygen-containing gas, the exhaust gas moves outwardly from the central regions of the electrolyte electrode assemblies 26 through the discharge channel 236 between the separators 212, and flows toward the center of the separators 212. The exhaust gas flows into the four exhaust gas passages 210 formed near the center of separators 212 as an exhaust gas manifold, and is discharged from the exhaust gas passages 210 to the outside.

In the fourth embodiment, the first cylindrical portion 39 is subjected to the crimping process such that a predetermined overlapping portion is formed in each of the plate 214 of one separator 212 and the plate 216 of the other separator 212. Thus, the same advantages as in the case of the first to third embodiments can be obtained. For example, the desired sealing performance can be maintained, and improvement in the reliability is achieved. It is possible to prevent damage (degradation) of the separators 212 or damage or the like of the electrolyte electrode assemblies 26 due to the load application.

INDUSTRIAL APPLICABILITY

In the present invention, in one separator and the other separator, the first and second members are plastically deformed respectively such that the predetermined overlapping portions are sealed hermetically. Thus, no glassy seal members having heat resistance and flexibility for maintaining the insulating performance and the sealing performance at high temperature are required. Therefore, shattering or volatilization of the seal members does not occur. Improvement in the sealing reliability and durability at the overlapping portions is achieved suitably.

Further, no load needs to be applied to the overlapping portions for improving the sealing performance. Thus, it is possible to prevent damage (degradation) of the separators or damage or the like of the electrolyte electrode assemblies, which would otherwise occur due to the load application. Further, no excessive stress is generated at the overlapping portions. The desired sealing performance is maintained, and improvement in the reliability is achieved. Further, no load mechanism for applying the load is required. Accordingly, reduction in the overall weight and heat capacity of the fuel cell is achieved easily.

The invention claimed is:

1. A fuel cell formed by stacking an electrolyte electrode assembly and a pair of separators alternately in a stacking direction, said pair of separators including a first separator and a second separator, said electrolyte electrode assembly including an anode, a cathode, and an electrolyte interposed between said anode and said cathode, wherein:

each of said first and second separators includes a first plate and a second plate which are stacked together in the stacking direction, wherein the first plate and the second plate of each of the first and second separators extend along an entire surface of the electrolyte electrode assembly perpendicular to the stacking direction;

said electrolyte electrode assembly is sandwiched between the first separator and the second separator;

a supply passage for one of a fuel gas and an oxygen-containing gas extends through said fuel cell in the stacking direction;

wherein the first plate of the first separator includes an extended portion that extends over and wraps around an end portion of the second plate of the second separator in the stacking direction to completely shield the end portion of the second plate from the supply passage in the stacking direction, wherein the extended portion of the first plate of the first separator forms a wall of the supply passage;

wherein the second plate of the second separator does not form the wall of the supply passage;

wherein the extended portion of the first plate and the end portion of the second plate form a joint portion; and wherein said joint portion is provided around an entire perimeter of said supply passage.

2. A fuel cell according to claim 1, wherein said extended portion of the first plate and said end portion of the second plate form said joint portion by a crimping process.

3. A fuel cell according to claim 1, wherein an insulating member is interposed between said first plate of the first separator and said second plate of the second separator at said joint portion.

4. A fuel cell according to claim 1, wherein said first plate and second plate of each separator selectively form a fuel gas channel for supplying a fuel gas toward said anode and an oxygen-containing gas channel for supplying an oxygen-containing gas toward said cathode.

5. A fuel cell according to claim 4, wherein first protrusions forming said fuel gas channel are provided on one surface of said first plate;

second protrusions forming said oxygen-containing gas channel are provided on the other surface of said first plate; and said second plate comprises a channel member joined to one surface or the other surface of said first plate for forming a fuel gas supply channel connected between a fuel gas supply unit and said fuel gas channel.

6. A fuel cell according to claim 5, wherein said joint portion includes a cylindrical portion subjected to a crimping process, and said cylindrical portion is formed around said fuel gas supply unit, and protrudes in the stacking direction.

7. A fuel cell according to claim 4, wherein said fuel gas channel and said oxygen-containing gas channel are formed between said first and second plates of each separator; and said fuel gas channel supplies the fuel gas to said anode, and said oxygen-containing gas channel supplies the oxygen-containing gas to said cathode.

8. A fuel cell according to claim 7, wherein said joint portion includes a cylindrical portion subjected to a crimping process, and said cylindrical portion is formed around said fuel gas supply unit, and protrudes in the stacking direction.

9. A fuel cell according to claim 4, wherein a third plate is interposed between said first and second plates of each separator;

and said fuel gas channel is formed between said first plate and said anode, said oxygen-containing gas channel is formed between said second plate and said cathode, and said third plate divides said fuel gas channel and said oxygen-containing gas channel.

10. A fuel cell according to claim 9, wherein said joint portion comprises a first cylindrical portion subjected to a crimping process, and said first cylindrical portion is formed around said fuel gas supply unit, and protrudes in the stacking direction; and a second cylindrical portion subjected to a crimping process, and said second cylindrical portion is formed around an oxygen-containing gas supply unit, and protrudes in the stacking direction.

\* \* \* \* \*